United States Patent
Ra et al.

(10) Patent No.: US 9,621,487 B2
(45) Date of Patent: Apr. 11, 2017

(54) METHOD AND APPARATUS FOR PROTECTION SWITCHING BASED ON MEMORY CONTROL IN PACKET TRANSPORT SYSTEM

(71) Applicant: Electronics and Telecommunications Research Institute, Daejeon (KR)

(72) Inventors: Yong Wook Ra, Daejeon (KR); Jeong Dong Ryoo, Daejeon (KR)

(73) Assignee: Electronics and Telecommunications Research Insitute, Daejeon (KR)

( * ) Notice: Subject to any disclaimer, the term of this patent is extended or adjusted under 35 U.S.C. 154(b) by 105 days.

(21) Appl. No.: 14/657,344

(22) Filed: Mar. 13, 2015

(65) Prior Publication Data
US 2015/0271107 A1    Sep. 24, 2015

(30) Foreign Application Priority Data

Mar. 21, 2014  (KR) .......................... 10-2014-0033229

(51) Int. Cl.
| | |
|---|---|
| *G06F 11/00* | (2006.01) |
| *H04J 1/16* | (2006.01) |
| *H04L 1/00* | (2006.01) |
| *H04L 12/26* | (2006.01) |
| *H04L 12/939* | (2013.01) |
| *H04L 12/707* | (2013.01) |

(52) U.S. Cl.
CPC ............ *H04L 49/557* (2013.01); *H04L 45/22* (2013.01)

(58) Field of Classification Search
CPC ............................... H04L 49/557; H04L 45/22
USPC .................................................. 370/216–228
See application file for complete search history.

(56) References Cited

U.S. PATENT DOCUMENTS

| | | | | |
|---|---|---|---|---|
| 8,149,689 B2* | 4/2012 | Endo | ..................... | H04L 12/66 370/217 |
| 8,218,434 B1* | 7/2012 | Brown | .................... | H04L 45/22 370/227 |
| 8,804,656 B2* | 8/2014 | Kitazoe | ............. | H04W 36/0038 370/331 |
| 2008/0032718 A1* | 2/2008 | Suresh | .................. | H04W 48/12 455/466 |
| 2008/0068988 A1* | 3/2008 | Tochio | .................... | H04L 45/22 370/228 |

(Continued)

FOREIGN PATENT DOCUMENTS

KR      1020130068204 A      6/2013

*Primary Examiner* — Chuong T Ho
(74) *Attorney, Agent, or Firm* — William Park & Associates Ltd.

(57) ABSTRACT

A protection switching method and apparatus based on a memory control in a packet transport system are provided. The protection switching method may perform hardware-based protection switching based on a type of path failures that occur. The protection switching method may perform protection switching for each of an Automatic Protection Switching (APS) frame or a Loss of Continuity (LoC)/Clear Loss of Continuity (CLoC) message received via an interface unit from a packet processor, a LoC/CLoC message received via a local bus interface from a host processor, an APS frame generation command input via the local bus interface from protection software (SW) of the host processor, and an APS frame generation command input via another interface unit from the protection SW.

9 Claims, 19 Drawing Sheets

(56) References Cited

U.S. PATENT DOCUMENTS

| | | | |
|---|---|---|---|
| 2009/0232148 A1* | 9/2009 | Endo | H04L 12/66 370/401 |
| 2010/0135291 A1 | 6/2010 | Martin et al. | |
| 2010/0290340 A1 | 11/2010 | Lee et al. | |
| 2012/0195190 A1* | 8/2012 | Singh | H04L 45/28 370/225 |
| 2013/0121140 A1 | 5/2013 | Ryoo et al. | |
| 2013/0301404 A1* | 11/2013 | Kano | H04L 12/4641 370/228 |
| 2014/0269264 A1* | 9/2014 | Sakamoto | H04L 45/28 370/228 |
| 2014/0286154 A1* | 9/2014 | O'Connor | H04L 41/0659 370/218 |

* cited by examiner

FIG. 6

Target line card table ~610

| Keys | Results Field | | |
|---|---|---|---|
| Connection ID | APS ID | W/P | Destination Line Card |
| 0x100 | 0x11 | 0 (P) | 6 |
| 0x102 | 0x12 | 0 (P) | 6 |
| 0x104 | 0x11 | 1 (W) | 10 |
| 0x106 | 0x13 | 0 (P) | 6 |

☐ Statically set through local bus interface
611

Aggregation table ~620

| Keys | Results Field | |
|---|---|---|
| APS ID | Traffic ID | Destination Line Card |
| 0x11 | 0x111 | 1 |
| 0x11 | 0x112 | 3 |
| 0x11 | 0x135 | 4 |
| 0x12 | 0x147 | 7 |
| 0x12 | 0x102 | 2 |
| 0x13 | 0x235 | 5 |
| 0x13 | 0x113 | 9 |

☐ Statically set through local bus interface
621

FIG. 7

MI table 710

| Keys | Results Field | | | | | |
|---|---|---|---|---|---|---|
| APS ID | Holdoff timer sec | Holdoff timer m/s | Temporary SF-W | Temporary SF-P | Affected Path | HT running |
| 0x11 | 0 | 0 | 0 | 0 | 0 | 0 |
| 0x12 | 0 | 0 | 0 | 0 | 0 | 0 |
| 0x13 | 0 | 10 | 0 | 1 | 1 | 1 |

▭ Statically set through local bus interface 711
▭ Dynamically set through data path 7 (input message) 712

PI table 720

| Keys | Results Field | | | |
|---|---|---|---|---|
| APS ID | Local Freeze Enable | Local SF-W | Local SF-P | Remote Request |
| 0x11 | 0 | 0 | 1 | 0 |
| 0x12 | 0 | 0 | 1 | 0 |
| 0x13 | 0 | 0 | 0 | 0 |

▭ Dynamically set through local bus interface 721
▭ Dynamically set through data path 7 (input message) 722
▭ Dynamically set through data path 2 (input message) 723

Dynamic TX frame structure table 730

| Keys | Results Field | | | |
|---|---|---|---|---|
| APS ID | Tx request | Tx Rn | Tx Bn | MI Switching |
| 0x11 | 0 | 0 | 1 | 0 |
| 0x12 | 0 | 0 | 1 | 0 |
| 0x13 | 0 | 0 | 0 | 0 |

▭ Dynamically set through data paths 2/5/7 (input message) 731
▭ Statically set through local bus interface 732

METHOD AND APPARATUS FOR PROTECTION SWITCHING BASED ON MEMORY CONTROL IN PACKET TRANSPORT SYSTEM

CROSS-REFERENCE TO RELATED APPLICATION

This application claims the benefit of Korean Patent Application No. 10-2014-0033229, filed on Mar. 21, 2014, in the Korean Intellectual Property Office, the disclosure of which is incorporated herein by reference.

BACKGROUND

1. Field of the Invention

The present invention relates to a method and apparatus for protection switching based on memory control, and more particularly, to a protection switching apparatus and method for performing data path protection switching by hardware when a failure occurs in a data path for transmission and reception between packet transport systems.

2. Description of the Related Art

Due to popularization of the Internet, and wire-wireless Internet convergence, data traffic is gradually increased, which may lead to a limitation to acceptance of a high-quality service, for example an Internet Protocol Television (IPTV), to an existing packet transport system. Accordingly, schemes for various premium transmission services to provide an end-to-end Quality of Service (QoS) and scalability using a data link layer are being sought.

To provide high-quality premium transmission services, a stable operation may need to be performed, and an efficiency of a packet transport system may need to be maximized, despite a failure occurring in the packet transport system or a failure in a data path between packet transport systems. To provide high-quality premium transmission services between packet transport systems, protection switching, restoration, and the like may be used.

The protection switching may refer to a method of classifying paths between packet transport systems in a transport network into working paths and protection paths, of carrying traffic, that is, a data packet via a working path when no failure occurs, and of carrying traffic via a protection path based on control of an operator when a failure occurs in a network.

The restoration may refer to a method of restoring an interrupted service to an original service state, using resources and a path available in a network including packet transport systems.

Conventional protection switching between packet transport systems is performed using a general purpose processor, through communication between a packet processor, a host processor, and a main processor that is an upper layer processor. The packet processor, the host processor and the main processor may be mounted in each of a plurality of line cards of a packet transport system. The main processor may control the packet transport system. For example, the conventional protection switching may be performed on a path failure by processing an Operation, Administration and Maintenance (OAM) frame and an Automatic Protection Switching (APS) frame including protection switching protocol message information. In other words, an occurrence of the path failure may be recognized first by a hardware-based packet processor in a line card. However, a packet processor in a line card that detects the path failure may transmit a failure signal and event information to a host processor mounted in the line card and accordingly, protection switching may be performed based on software by protocol communication with the main processor.

As described above, the conventional protection switching may be processed in software with a relatively low speed based on a main processor of a packet transport system and a host processor in a plurality of line cards. Accordingly, when a failure occurs, a few hundreds of connections satisfying a time of about 50 milliseconds (ms) required for protection switching may be set as a maximum limit. Accordingly, Continuity Check (CC) and Connectivity Verification (CV) requiring real-time processing may not be efficiently performed, and a packet may be lost based on a situation of a path failure, which may result in a reduction in performance of a packet transport system.

SUMMARY

An aspect of the present invention provides a protection switching method for performing protection switching and managing paths for each transmission service for traffic restoration, by performing hardware-based protection switching based on a type of data path failures occurring between packet transport systems.

Another aspect of the present invention provides a protection switching method for reducing a traffic loss by more quickly performing protection switching of a data path between packet transport systems through hardware-based protection switching.

Still another aspect of the present invention provides a protection switching method for providing a higher-quality service by increasing a number of connections satisfying a requirement time of protection switching required by a packet transport system.

According to an aspect of the present invention, there is provided a method for performing protection switching of a data path between packet transport systems, each including a line card, based on control data transmitted and received between a packet processor and a host processor in a line card, the method including: determining whether traffic switching for protection switching is required, when control data input from the packet processor is a first Automatic Protection Switching (APS) frame; generating an APS frame generation command and a Bridge and Selector (B/S) message generation command corresponding to the first APS frame, when the traffic switching is required; and transmitting, to the packet processor, a second APS frame generated based on the APS frame generation command, and a B/S message generated based on the B/S message generation command, wherein the packet processor performs protection switching through traffic switching based on the B/S message.

The determining may include, when a request/state field of the first APS frame indicates a Signal Fail on Working transport entity (SF-W) or a Signal Fail on Protection transport entity (SF-P), determining whether the traffic switching is required.

The determining may include determining whether the traffic switching is required, based on at least one of a Forced Switch (FS) mode, a Lock-Out (LO) mode, and a freeze mode.

The generating may include generating a command to generate a B/S message that is to be transmitted to a packet processor of a destination line card included in a packet transport system corresponding to an APS identification (ID) included in the B/S message generation command.

According to another aspect of the present invention, there is provided a method for performing protection switching of a data path between packet transport systems, each including a line card, based on control data transmitted and received between a packet processor and a host processor in a line card, the method including: determining whether a destination line card corresponding to a Loss of Continuity (LoC)/Clear Loss of Continuity (CLoC) message received from another line card of a packet transport system is matched to a reception line card, when control data input from the packet processor is the LoC/CLoC message; determining whether traffic switching for protection switching is required, based on the LoC/CLoC message, when the destination line card is matched to the reception line card; generating an APS frame generation command and a B/S message generation command corresponding to the LoC/CLoC message, when the traffic switching is required; and transmitting, to the packet processor, an APS frame generated based on the APS frame generation command, and a B/S message generated based on the B/S message generation command, wherein the packet processor performs protection switching through traffic switching based on the B/S message, and is included in the reception line card.

The determining whether the traffic switching is required may include determining whether the traffic switching is required, based on whether a path failure occurs in an active transport entity corresponding to a protection switching apparatus.

The method may further include transmitting the LoC/CLoC message to the host processor, when the traffic switching is not required.

The method may further include determining whether a value of a hold-off timer corresponding to an APS ID included in the LoC/CLoC message is set, and delaying the LoC/CLoC message by the value of the hold-off timer, when the value of the hold-off timer is set.

The method may further include discarding the LoC/CLoC message, when the destination line card is not matched to the reception line card.

According to another aspect of the present invention, there is provided a method for performing protection switching of a data path between packet transport systems, each including a line card, based on control data transmitted and received between a packet processor and a host processor in a line card, the method including: determining whether a destination line card corresponding to a first LoC/CLoC message is matched to a reception line card, when control data input from the host processor is the first LoC/CLoC message; determining whether traffic switching for protection switching is required, based on the first LoC/CLoC message, when the destination line card is matched to the reception line card; generating an APS frame generation command and a B/S message generation command corresponding to the first LoC/CLoC message; and transmitting, to the packet processor, an APS frame generated based on the APS frame generation command, and a B/S message generated based on the B/S message generation command, when the traffic switching is required, wherein the packet processor performs protection switching through traffic switching based on the B/S message, and is included in the reception line card.

The method may further include, when the destination line card is not matched to the reception line card, generating a second LoC/CLoC message to correspond to the destination line card, and transmitting the second LoC/CLoC message to a packet processor of a destination line card corresponding to an APS ID. The APS ID may be included in the second LoC/CLoC message.

The transmitting may include transmitting the B/S message to a packet processor of a destination line card corresponding to an APS ID included in the first LoC/CLoC message.

According to another aspect of the present invention, there is provided a method for performing protection switching of a data path between packet transport systems, each including a line card, based on control data transmitted and received between a packet processor and a host processor in a line card, the method including: generating a B/S message generation command corresponding to an APS frame generation command, when control data input from the host processor is the APS frame generation command; and transmitting, to the packet processor, an APS frame generated based on the APS frame generation command, and a B/S message generated based on the B/S message generation command, wherein the packet processor performs protection switching through traffic switching based on the B/S message.

According to another aspect of the present invention, there is provided a protection switching apparatus for controlling protection switching of a data path between packet transport systems, between a packet processor and a host processor in a line card, the protection switching apparatus including: a classification unit to determine whether control data input to the protection switching apparatus is an APS frame or a LoC/CLoC message; a control register unit to determine whether traffic switching for protection switching is required, based on the APS frame, when the control data is determined to be the APS frame, and to generate an APS frame generation command and a B/S message generation command, based on a determination result; and a transmission arbitration unit to transmit, to the packet processor, an APS frame generated based on the APS frame generation command, and a B/S message generated based on the B/S message generation command, wherein the packet processor performs protection switching through traffic switching based on the B/S message.

When a request/state field of the APS frame indicates an SF-W or an SF-P, the control register unit may determine whether the traffic switching is required.

The transmission arbitration unit may generate a B/S message that is to be transmitted to a packet processor of a destination line card corresponding to an APS ID included in the B/S message generation command.

The protection switching apparatus may further include a parsing unit to transmit, to the classification unit, a preset field extracted from the control data.

The protection switching apparatus may further include a database (DB) controller to update an internal table of the protection switching apparatus based on field information of the APS frame generation command, and to transmit the APS frame generation command to the control register unit.

According to another aspect of the present invention, there is provided a protection switching apparatus for controlling protection switching of a data path between packet transport systems, between a packet processor and a host processor in a line card, the protection switching apparatus including: a classification unit to determine whether control data input to the protection switching apparatus is an APS frame or a LoC/CLoC message; a detection unit to determine whether a destination line card corresponding to the LoC/CLoC message is matched to a reception line card, when the control data is determined to be the LoC/CLoC message; a transmission message generation unit to determine whether traffic switching for protection switching is required, based on the LoC/CLoC message, when the destination line card is matched to the reception line card, and to generate an APS frame generation command and a B/S message generation command corresponding to the LoC/CLoC message, when the traffic switching is determined to be required; and a transmission arbitration unit to transmit, to the packet processor, an APS frame generated based on the APS frame generation command, and a B/S message generated based on the B/S message generation command, wherein the packet processor performs protection switching through traffic switching based on the B/S message, and is included in the reception line card.

The transmission message generation unit may determine whether the traffic switching is required, based on whether a path failure occurs in an active transport entity corresponding to the protection switching apparatus.

EFFECT

According to embodiments of the present invention, hardware-based protection switching may be performed based on a type of data path failures occurring between packet transport systems and thus, it is possible to perform protection switching and to manage paths for each transmission service for traffic restoration.

Additionally, according to embodiments of the present invention, protection switching of a data path between packet transport systems may be more quickly performed through hardware-based protection switching and thus, it is possible to reduce a traffic loss.

Furthermore, according to embodiments of the present invention, a number of connections satisfying a requirement time of protection switching required by a packet transport system may be increased and thus, it is possible to provide a higher-quality service.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 6 is a diagram illustrating structures of lookup tables used in a protection switching apparatus according to an embodiment;

FIG. 7 is a diagram illustrating structures of lookup tables used in a DB controller of FIG. 3;

DETAILED DESCRIPTION

Figure 1:
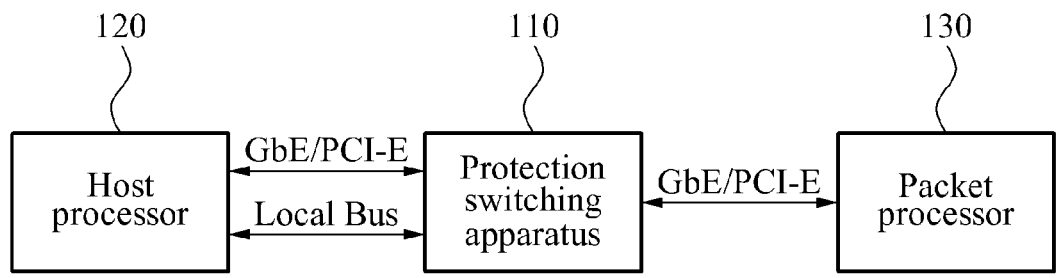
FIG. 1 is a diagram illustrating a line card of a packet transport system to which a protection switching apparatus is applied according to an embodiment.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 briefly illustrates a line card of a packet transport system to which a protection switching apparatus 110 is applied according to an embodiment.

The line card may include the protection switching apparatus 110, a host processor 120, and a packet processor 130. Additionally, the line card, together with a main processor, may be included in the packet transport system.

The protection switching apparatus 110 may be located between the host processor 120 and the packet processor 130 within the line card. Additionally, the protection switching apparatus 110 may perform path protection switching on a data packet transferred between packet transport systems, based on control data transmitted and received between the host processor 120 and the packet processor 130.

The control data may include an Automatic Protection Switching (APS) frame, and a Loss of Continuity (LoC)/Clear Loss of Continuity (CLoC) message. A LoC message may indicate an occurrence of a failure in a data path between packet transport systems. A CLoC message may include an instruction to eliminate a set path failure state when a path failure is recognized based on the LoC message. The data packet may include a Multi-Protocol Label Switching (MPLS), a Pseudo Wire (PW), a Multi-Protocol Label Switching-Transport Profile (MPLS-TP), a carrier Ethernet, and the like.

In the above packet transport system, the host processor 120 in the line card may use a general purpose processor, and may communicate with a main processor configured to control the packet transport system. Additionally, the host processor 120 may process related Operation, Administration and Maintenance (OAM) messages, and may operate a protection switching protocol. Accordingly, the host processor 120 may control the line card.

The packet processor 130 may perform packet processing to transmit and receive a data packet between packet transport systems in a transport network. The packet processing may be performed using an application-specific integrated circuit (ASIC) or a network processor. Additionally, the packet processor 130 may process transmission and reception of a Connectivity Check Message (CCM) associated with control data, that is, an OAM frame, and may transmit signal information, for example a LoC/CLoC message, to the protection switching apparatus 110.

The protection switching apparatus 110 may process control data using a physical interface between the host processor 120 and the packet processor 130. The physical interface may include, for example, a Gigabit Ethernet (GbE) interface, a Serial Gigabit Media Independent Interface (SGMII), or a Peripheral Component Interconnect Express (PCI-E) interface.

Figure 2:
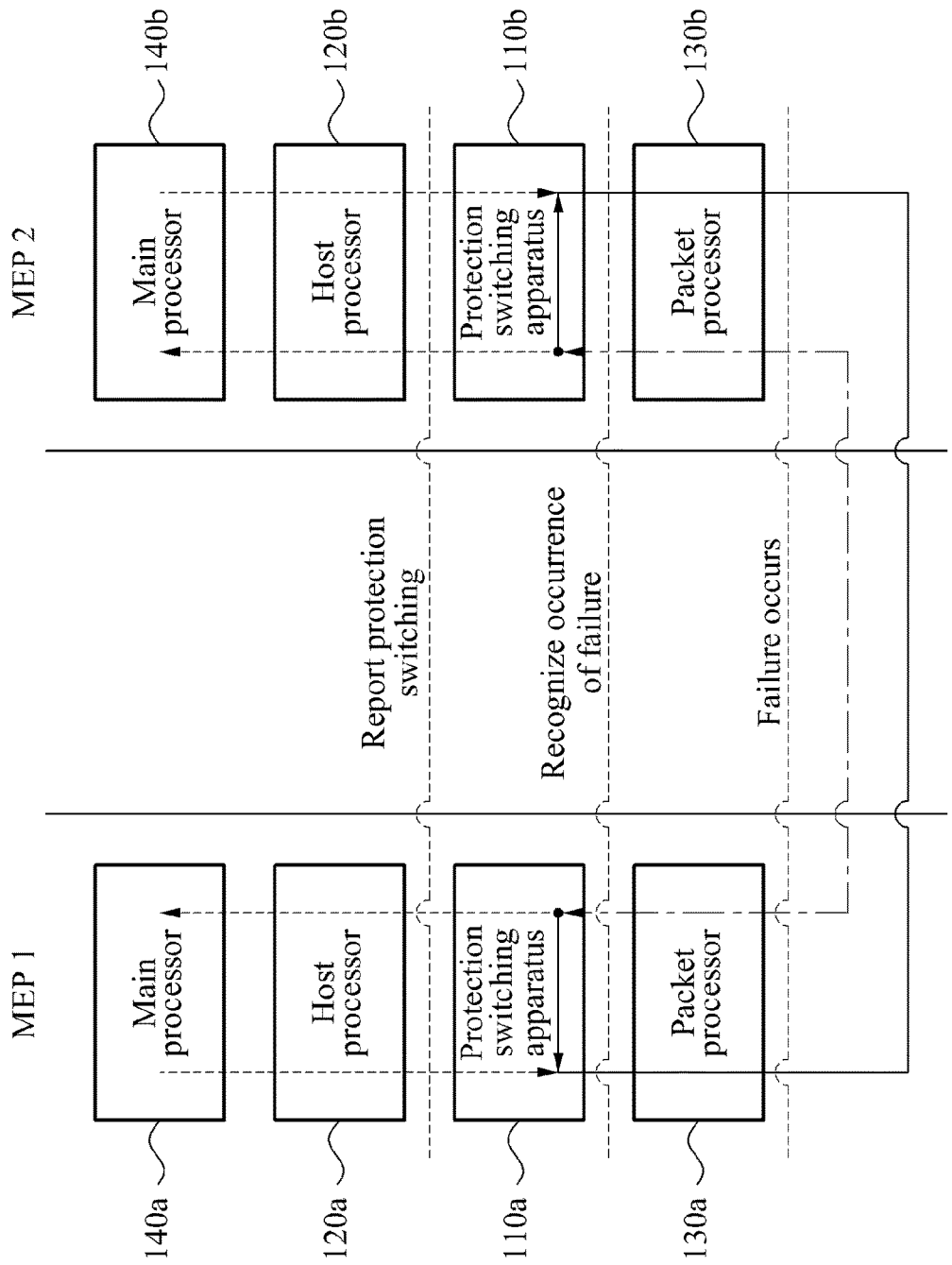
FIG. 2 is a diagram illustrating a process of controlling protection switching of a data path between both ends of a packet transport system using a protection switching apparatus according to an embodiment.

FIG. 2 is a diagram illustrating a process of controlling protection switching of a data path between both ends of a packet transport system using a protection switching apparatus according to an embodiment.

FIG. 2 illustrates a hierarchy of a process of controlling protection switching of a data path in a Maintenance Entity Group (MEG) End Point (MEP) of each of both the ends of the packet transport system. The packet transport system may include two main processors, and a plurality of line cards, for duplication. The main processors may control the packet transport system. Each of the line cards may include a packet processor, a protection switching apparatus, and a host processor.

For example, when a LoC/CLoC message is generated from packet processors 130a and 130b due to a failure in a data path, or when a value of a request/state field of an APS frame transmitted to protection switching apparatuses 110a and 110b through the packet processors 130a and 130b indicates a Signal Fail on Working transport entity (SF-W) or a Signal Fail on Protection transport entity (SF-P), each of the protection switching apparatuses 110a and 110b may generate a protection switching command, and may transfer the protection switching command to each of the packet processors 130a and 130b. In response to the protection switching command, each of the packet processors 130a and 130b may change a transmission path of a data packet between packet transport systems. The protection switching apparatuses 110a and 110b may be installed in line cards of both the ends of the packet transport system, respectively.

The protection switching command may include an APS frame generated based on an APS frame generation command, and a Bridge and Selector (B/S) message generated based on a B/S message generation command.

The protection switching apparatuses 110a and 110b may notify the upper layer host processors 120a and 120b of a change in a path due to an occurrence of a failure in a data path. The host processors 120a and 120b may notify upper layer main processors 140a and 140b of an APS frame having a request/state field indicating an SF, and of an APS frame that indicates another state and that is received from the protection switching apparatuses 110a and 110b through the packet processors 130a and 130b, and may perform processing. The APS frame having the request/state field indicating the SF may refer to an APS frame in which a request/state field indicates either an SF-W or an SF-P.

For example, when protection switching of a data path is required by an operator, despite a request/state field of a protocol-related message generated from the main processors 140a and 140b having a value other than an SF-P and an SF-W, the host processors 120a and 120b may transmit a command to process the protocol-related message to the protection switching apparatuses 110a and 110b. The protocol-related message may include an APS frame generation command, or a B/S message generation command.

In another example, when a command to process a protocol-related message that does not indicate an SF is received from the host processors 120a and 120b, or when a LoC/CLoC message caused by a failure in a data path, or an APS frame in which a value of a request/state field indicates an SF-P or an SF-W is received from the packet processors 130a and 130b, the protection switching apparatuses 110a and 110b may arbitrate a transmission priority, and may transmit control data including information on a corresponding message to the packet processors 130a and 130b.

In this example, the protocol-related message may refer to a message transmitted from the host processor 120 of FIG. 1, for example, an APS frame generation command or a B/S message generation command. Additionally, the control data may include an APS frame generated based on the APS frame generation command, or a B/S message generated based on the B/S message generation command.

Figure 3:
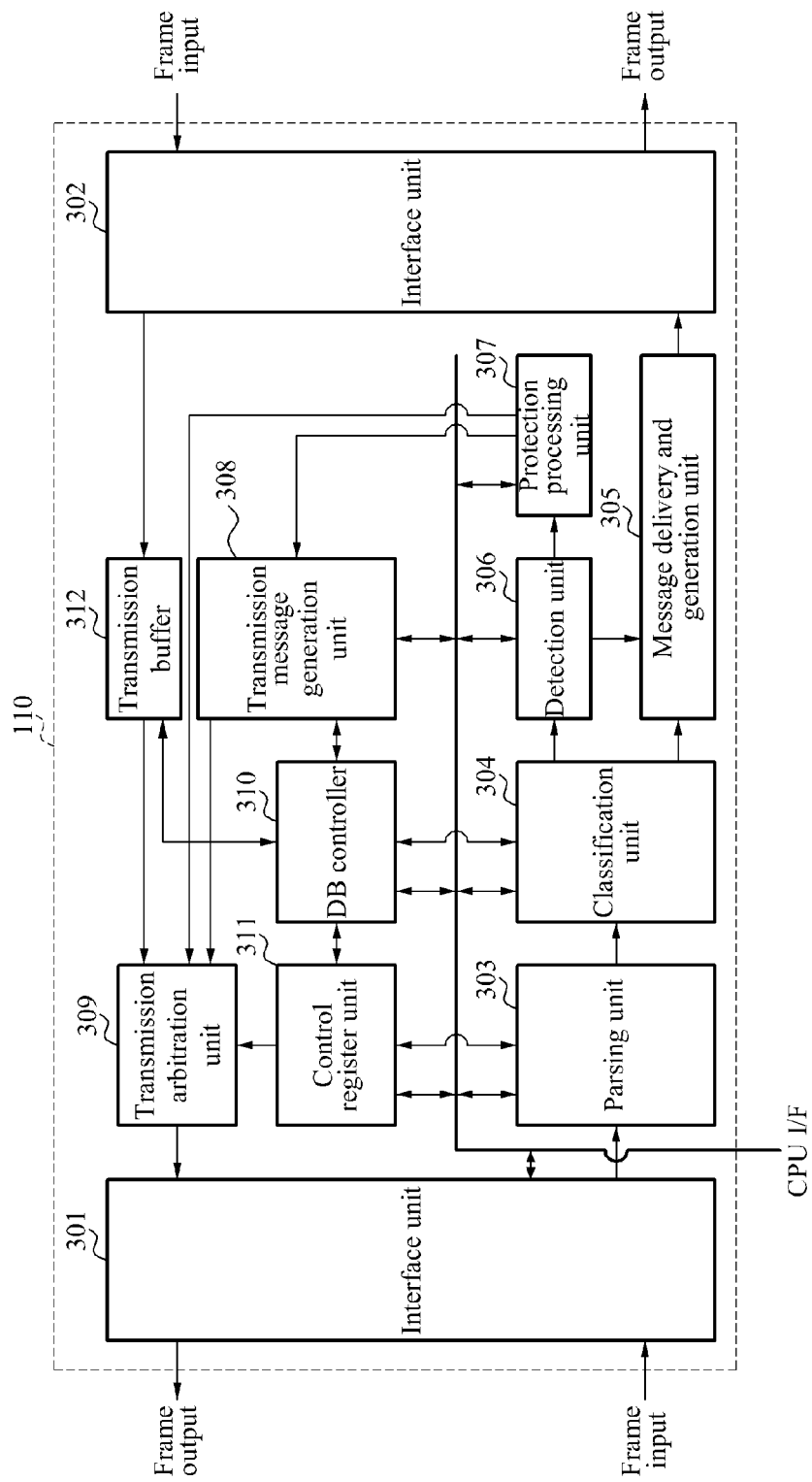
FIG. 3 is a diagram illustrating a structure of the protection switching apparatus of FIG. 1.

FIG. 3 is a diagram illustrating a structure of the protection switching apparatus 110 of FIG. 1.

Referring to FIG. 3, the protection switching apparatus 110 may include interface units 301 and 302, a parsing unit 303, a classification unit 304, a message delivery and generation unit 305, a detection unit 306, a protection processing unit 307, a transmission message generation unit 308, a transmission arbitration unit 309, a database (DB) controller 310, a control register unit 311, and a transmission buffer 312.

The interface units 301 and 302 may transmit and receive control data between the packet processor 130 and the host processor 120 of FIG. 1, and may include a physical interface, for example, a GbE interface, an SGMII, a PCI-E interface, and the like.

The parsing unit 303 may receive an APS frame or a LoC/CLoC message from the packet processor 130 via the interface unit 301. Additionally, the parsing unit 303 may extract fields used by the classification unit 304 from the received APS frame or the received LoC/CLoC message, and may store the fields. The fields may include a value of each of a channel type of a first header (for example, Y.1731 or G.8113.1), an Operation code (OP-code), a request/state field, a requested signal field, a bridged signal field, a flags field, and the like. Moreover, the parsing unit 303 may transfer the received APS frame or the received LoC/CLoC message to the classification unit 304.

The classification unit 304 may receive the fields extracted by the parsing unit 303, and may check internal tables that are internally stored and managed to classify protection groups corresponding to received control data. For example, the protection groups may be classified into a working path and a protection path for each index. The classification unit 304 may update an internal table if necessary. Additionally, the classification unit 304 may determine whether the received control data is an APS frame, based on the channel type of the first header (for example, Y.1731 or G.8113.1), and an OP-code based on the channel type.

In an example, when a LoC/CLoC message is received from the packet processor 130, the classification unit 304 may transfer the LoC/CLoC message to the detection unit 306. In another example, when a value of an OP-code of received control data indicates an APS, and when a value of a request/state field of a header in a received APS frame indicates an SF-P or an SF-W, the classification unit 304 may include a value of a requested signal field in the control data, and may transfer the control data to the DB controller 310. In still another example, the classification unit 304 may transfer the control data to the message delivery and generation unit 305 to transmit the control data directly to the host processor 120 without a separate change.

The message delivery and generation unit 305 may transfer control data including a message output from the classification unit 304, via the interface unit 302 to the host processor 120 without a change in a header.

The detection unit 306 may determine whether a LoC message is received from the classification unit 304. When the LoC message is received, the detection unit 306 may transfer the LoC message to the protection processing unit 307, and may notify the protection processing unit 307 of failure detection. Additionally, when the LoC message is received, the detection unit 306 may transfer a control signal including protection switching command information to the message delivery and generation unit 305, and may enable the message delivery and generation unit 305 to update a header of a message. The protection switching command information may include location information of B/S for protection switching. Additionally, a B/S message generation command may be generated based on the location information of the B/S.

In response to a notification of the failure detection being received from the detection unit 306, the protection processing unit 307 may generate an instruction to perform protection switching and may transfer the instruction to the transmission message generation unit 308, so that the packet processor 130 may perform protection switching.

The transmission message generation unit 308 may generate data including the instruction received from the protection processing unit 307. The data may be changed and generated for each index based on a reception instruction including an MEP index and an internal table of the DB controller 310. The transmission message generation unit 308 may transfer the generated data to the transmission arbitration unit 309. The data generated by the transmission message generation unit 308 may include an APS frame generation command, and a B/S message generation command.

The transmission arbitration unit 309 may perform transmission arbitration on the received APS frame generation command and the received B/S message generation command. The transmission arbitration unit 309 may generate an APS frame based on the APS frame generation command, and may generate a B/S message based on a B/S message generation command. Additionally, the transmission arbitration unit 309 may transmit the APS frame and the B/S message to the packet processor 130.

The DB controller 310 may include a plurality of DB tables. For example, the DB controller 310 may include a Management Information (MI) table, a Path Information (PI) table, a dynamic transmission (TX) frame structure table, and a static TX frame structure Table. The DB controller 310 may allocate a specific time slot to each client using a method of controlling an access to various DBs.

The control register unit 311 may manage valid signals and field control information for each input data, and may transmit and receive a control signal to and from the parsing unit 303 and the DB controller 310. Additionally, the control register unit 311 may determine whether a value of a request/state field of an APS frame indicates an SF-P or an SF-W, and may determine whether an SF is included in the APS frame.

The transmission buffer 312 may perform a function of holding an APS frame generation command received from the host processor 120 to transmit the APS frame generation command via the transmission arbitration unit 309.

When a LoC/CLoC message caused by a path failure occurring between the host processor 120 and the packet processor 130 is received, or when an APS frame having a request/state field indicating an SF is received, the protection switching apparatus 110 configured as described above may transmit a protection switching command to the packet processor 130, and may enable path protection switching of a data packet between a plurality of packet transport systems in a transport network. For example, protection switching may be performed by a packet processor in each of line cards connected physically to each other between packet transport systems that transmit a data packet (for example, an MPLS-TP, a PW, a carrier Ethernet, and the like).

Figure 4:
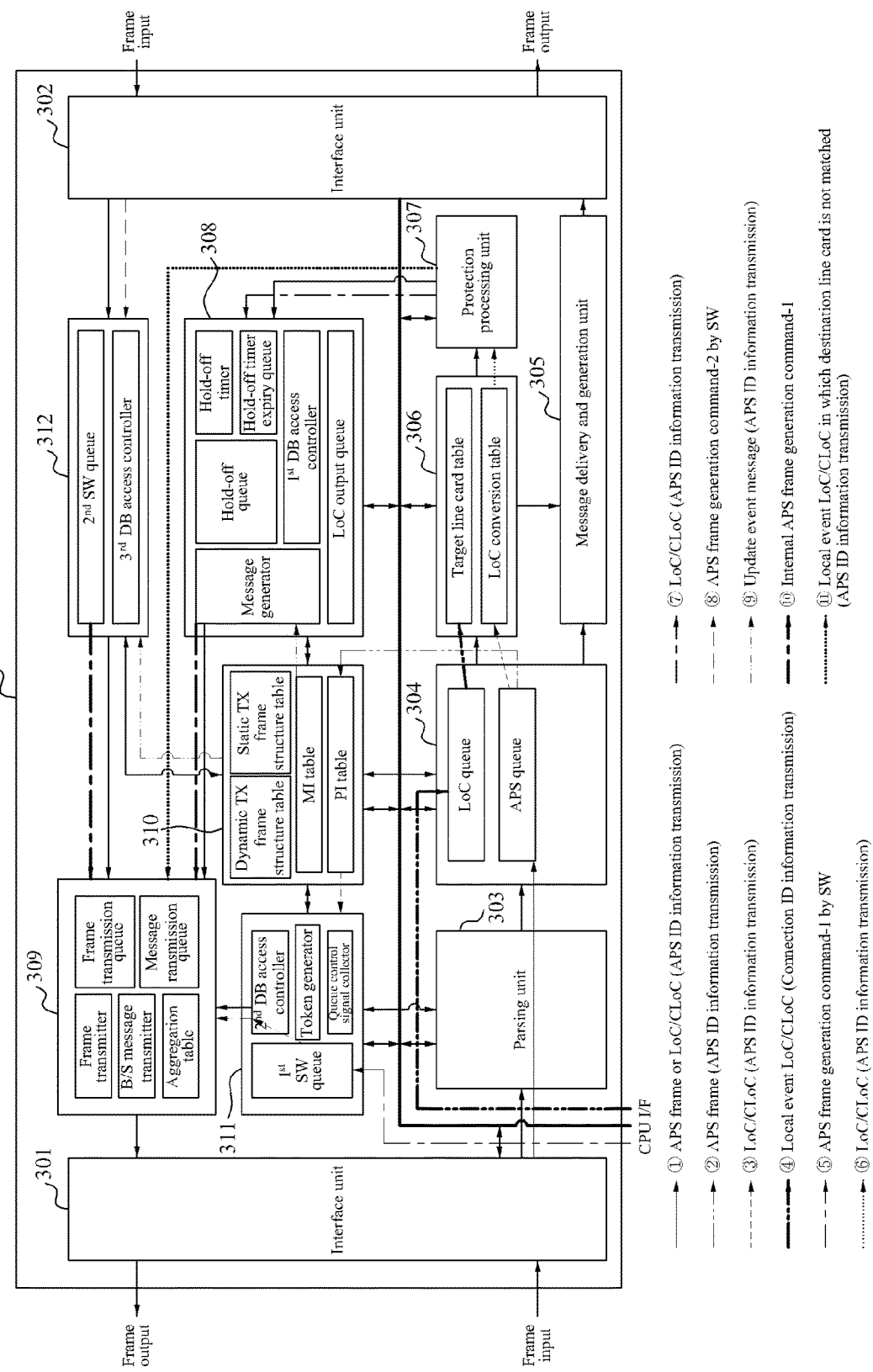
FIG. 4 further illustrates the structure of the protection switching apparatus.

FIG. 4 further illustrates the structure of the protection switching apparatus 110 of FIG. 3.

Referring to FIG. 4, the protection switching apparatus 110 may include the interface units 301 and 302, the parsing unit 303, the classification unit 304, the message delivery and generation unit 305, the detection unit 306, the protection processing unit 307, the transmission message generation unit 308, the transmission arbitration unit 309, the DB controller 310, the control register unit 311, and the transmission buffer 312.

The classification unit 304 may include a LoC queue and an APS queue. The detection unit 306 may include a target line card table, and a LoC conversion table. The transmission message generation unit 308 may include a hold-off timer, a hold-off timer expiry queue, a hold-off queue, a $1^{st}$ DB access controller, a message generator, and a LoC output queue. The transmission arbitration unit 309 may include a frame transmission queue, a message transmission queue, a frame transmitter, a B/S message transmitter, and an aggregation table. The DB controller 310 may include a dynamic TX frame structure table, a static TX frame structure table, a MI table, and a PI table. The control register unit 311 may include a $1^{st}$ software (SW) queue, a $2^{nd}$ DB access controller, a token generator, and a queue control signal collector. The transmission buffer 312 may include a $2^{nd}$ SW queue and a $3^{rd}$ DB access controller.

Event messages in the protection switching apparatus 110 may be transmitted through paths described below.

An APS frame received from the packet processor 130 via the interface unit 301 may be transmitted through message transmission paths 1, 2, 9 and 10 in sequence. A LoC/CLoC message received from the packet processor 130 via the interface unit 301 may be transmitted through message transmission paths 1, 3, 6, 7, 9 and 10 in sequence.

A LoC/CLoC message received from the host processor 120 via a local bus interface may be transmitted through message transmission paths 4, 6, 7, 9 and 10 in sequence. The LoC/CLoC message may be used to process a path failure recognized by a packet processor, and may be identical to an event message 501 of FIG. 5. The local bus interface may be, for example, a Central Processing Unit (CPU) Interface (I/F).

An APS frame generation command input from protection SW of the host processor 120 via the local bus interface may be transmitted through message transmission paths 5, 9, and 10 in sequence. The protection SW may be loaded in the host processor 120, and may process protection switching. Additionally, the APS frame generation command may be identical to an event message 503 of FIG. 5.

An APS frame generation command input from the protection SW of the host processor 120 via the interface unit 302 may be transmitted through message transmission paths 8, 9, and 10 in sequence. The APS frame generation command may be identical to the event message 503.

Hereinafter, a method of processing the APS frame, the LoC/CLoC message, the APS frame generation command, and the B/S message generation command in the protection switching apparatus 110 will be described.

APS Frame or LoC/CLoC Message Received Via the Interface Unit 301 from the Packet Processor 130

The parsing unit 303 may extract a value of each of an APS identification (ID), a channel type (for example, Y.1731 or G.8113.1), an OP-code, a request/state field, a protection type field, a requested signal field, a bridged signal field, a flags field, and the like, from the APS frame or the LoC/CLoC message received via the interface unit 301 from the packet processor 130.

The classification unit 304 may determine, based on the APS queue, whether input control data is an APS frame or a LoC/CLoC message. The LoC/CLoC message may be received from another line card in the same packet transport system.

When the input control data is determined to be the APS frame, the classification unit 304 may transfer the APS frame to the protection SW through the message delivery and generation unit 305. Additionally, the classification unit 304 may transmit the APS frame to the DB controller 310.

The DB controller 310 may update a remote request field of the PI table with a value of a request/state field in the APS frame.

When the value of the request/state field in the APS frame indicates an SF-W or an SF-P, the control register unit 311 may determine whether traffic switching for protection switching is required, based on a protection switching mode, for example, a Forced Switch (FS) mode, a Lock-Out (LO) mode, or a freeze mode.

In an example in which a value of a local freeze field is enabled, the control register unit 311 may determine that the traffic switching is not required. In another example in which the value of the local freeze field is not enabled and a request/state field of a received APS frame indicates an SF-W, when a local SF-W corresponding to a predetermined APS ID has a value of "0" in a PI table 720 of FIG. 7 (Yes=1, No=0), and when a TX request corresponding to the predetermined APS ID has values other than LO, SF-P, and FS in a dynamic TX frame structure table 730 of FIG. 7, the control register unit 311 may determine that the traffic switching is required. In still another example in which the request/state field of the received APS frame indicates an SF-P, when a local SF-P corresponding to a predetermined APS ID has a value of "0" in the PI table 720, and when a TX request field corresponding to the predetermined APS ID has values other than LO in the dynamic TX frame structure table 730, the control register unit 311 may determine that the traffic switching is required.

When the traffic switching is determined to be required, the control register unit 311 may generate an APS frame generation command, and a B/S message generation command, and may transfer the APS frame generation command and the B/S message generation command to the transmission arbitration unit 309.

The transmission arbitration unit 309 may transmit, to the packet processor 130, an APS frame generated based on the received APS frame generation command, and a B/S message generated based on the received B/S message generation command.

Various fields in addition to the above-described request/state field are known to one of ordinary skill in the art and accordingly, further description thereof is omitted herein.

Figure 5:
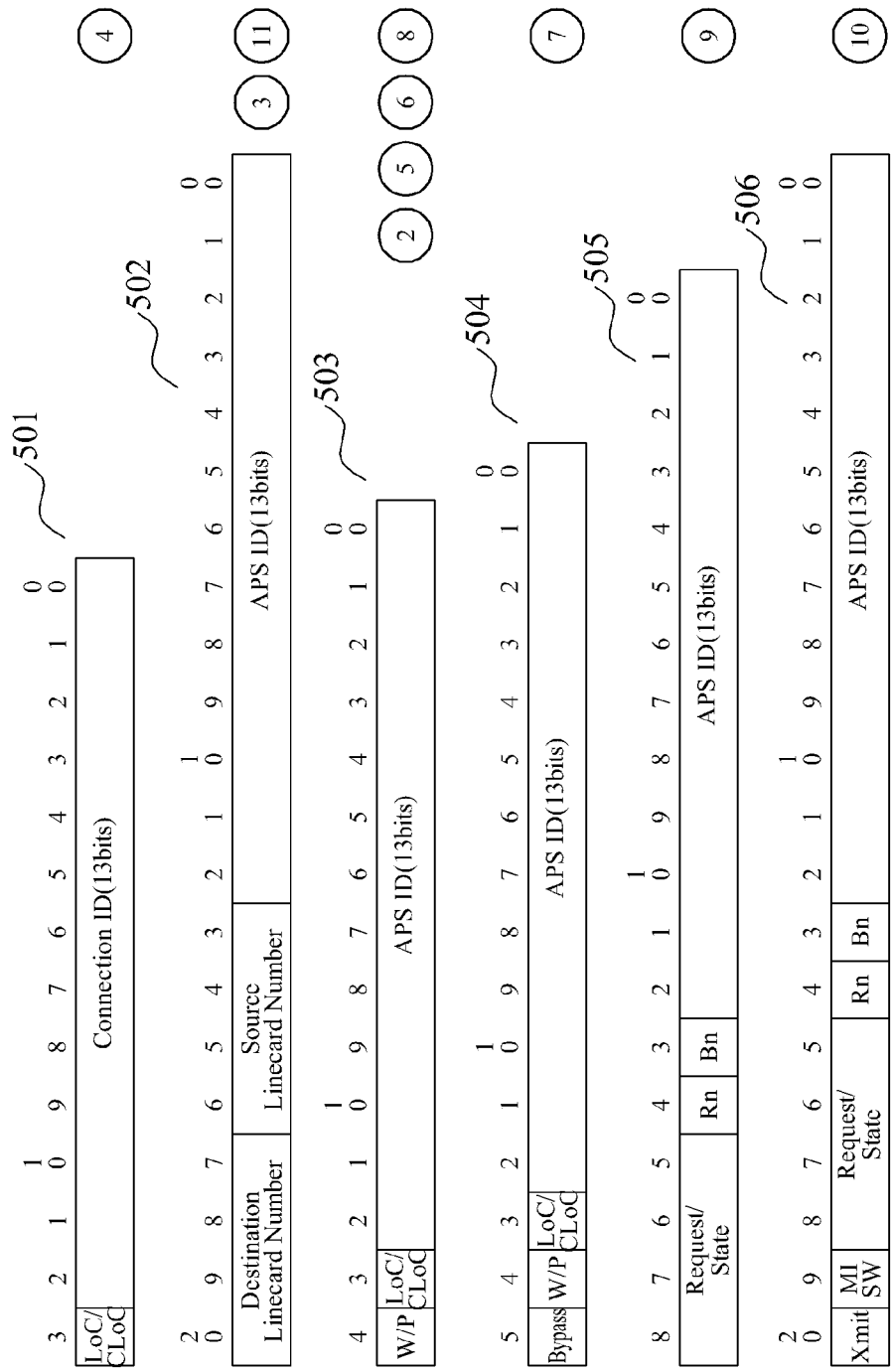
FIG. 5 is a diagram illustrating structures of event messages in a protection switching apparatus according to an embodiment.

For example, when input control data is a LoC/CLoC message input via the interface unit 301 through a packet processor of a reception line card from another line card in the same packet transport system, the detection unit 306 may look up the LoC conversion table based on an APS ID extracted by the parsing unit 303, and may transmit a converted event message 504 of FIG. 5 to the transmission message generation unit 308 by passing through the protection processing unit 307. In this example, the event message 504 may be converted from the event message 502 through the event message 503, and the LoC/CLoC message may be identical to the event message 502.

The transmission message generation unit 308 may look up the MI table using the 1$^{st}$ DB access controller. When a lookup result indicates that a value of the hold-off timer is set, the transmission message generation unit 308 may delay a LoC/CLoC message by the value of the hold-off timer, and may store the LoC/CLoC message in the hold-off timer expiry queue. Additionally, when the LoC/CLoC message is output from the hold-off timer expiry queue, the transmission message generation unit 308 may update the MI table, and may store the LoC/CLoC message in the hold-off queue.

When the lookup result indicates that the value of the hold-off timer is not set, the transmission message generation unit 308 may bypass the hold-off timer expiry queue, and may store the LoC/CLoC message in the hold-off queue.

When the traffic switching is required, the transmission message generation unit 308 may generate an APS frame generation command and a B/S message generation command, may transfer the APS frame generation command and the B/S message generation command to the transmission arbitration unit 309, and may store, in the LoC output queue, the event message 504 converted using the LoC conversion table.

The transmission arbitration unit 309 may generate an APS frame and a B/S message based on the received APS frame generation command and the received B/S message generation command, and may transmit the APS frame and the B/S message to the packet processor 130. Additionally, the transmission message generation unit 308 may transmit information stored in the LoC output queue to the protection SW via the local bus interface, using an Interrupt Service Routine (ISR) scheme. The input command may be, for example, at least one of the APS frame generation command and the B/S message generation command.

For example, when it is determined based on an extracted information value that a LoC does not occur in an active transport entity, that is, when the traffic switching is not required, the transmission message generation unit 308 may not generate an APS frame generation command and a B/S message generation command. Additionally, the transmission message generation unit 308 may update the PI table of the DB controller 310, and may store a LoC/CLoC message in the LoC output queue to transmit the LoC/CLoC message to the protection SW via the local bus interface.

In this example, the LoC/CLoC message may be identical to the event message 504. Additionally, the active transport entity may refer to a path activated to transmit and receive a current packet among working paths and protection paths for protection switching.

LoC/CLoC Message Received from the Host Processor 120 Via the Local Bus Interface The classification unit 304 may store, in the LoC queue, the LoC/CLoC message received from the host processor 120 via the local bus interface, and may transmit the LoC/CLoC message to the detection unit 306.

The detection unit 306 may look up the target line card table, and may determine whether a destination line card of the received LoC/CLoC message is matched to a reception line card. When the destination line card is matched to the reception line card, the detection unit 306 may transmit the converted event message 504 to the transmission message generation unit 308, and the transmission message generation unit 308 may look up the MI table using the 1$^{st}$ DB access controller.

The matching of the destination line card to the reception line card may indicate that a connection ID included in the LoC/CLoC message may be managed and controlled by a protection switching apparatus in the reception line card. In other words, the reception line card may be, for example, a line card including the protection switching apparatus 110. The LoC/CLoC message may be identical to the event message 501. Additionally, the connection ID may refer to a tunnel index of tunnels managed and connected physically to each other between different packet transport systems in a transport network. The tunnel index may include mapping between a MEP ID and a remote MEP ID.

When a lookup result indicates that the value of the hold-off timer is set, the transmission message generation unit 308 may delay the LoC/CLoC message by the value of the hold-off timer, and may store the LoC/CLoC message in the hold-off timer expiry queue. Additionally, when the LoC/CLoC message is output from hold-off timer expiry queue, the transmission message generation unit 308 may update the MI table of the DB controller 310, and may store the LoC/CLoC message in the hold-off queue.

When the value of the hold-off timer is not set, the transmission message generation unit 308 may bypass the hold-off timer expiry queue, and may store the LoC/CLoC message in the hold-off queue.

When traffic switching for protection switching is required, the transmission message generation unit 308 may generate an APS frame generation command and a B/S message generation command, and may transfer the APS frame generation command and the B/S message generation command to the transmission arbitration unit 309. Additionally, the transmission message generation unit 308 may store, in the LoC output queue, the event message 504 converted using the LoC conversion table.

The transmission arbitration unit 309 may generate an APS frame and a B/S message based on the received APS frame generation command and the received B/S message generation command, and may transmit the APS frame and the B/S message to the packet processor 130. Additionally, the transmission message generation unit 308 may transmit information stored in the LoC output queue to the protection SW via the local bus interface, using the ISR scheme.

For example, when it is determined based on an extracted information value that a LoC does not occur in an active transport entity, that is, when the traffic switching is not required, the transmission message generation unit 308 may not generate an APS frame generation command and a B/S message generation command. Additionally, the transmission message generation unit 308 may update the PI table of the DB controller 310, and may store a LoC/CLoC message in the LoC output queue to transmit the LoC/CLoC message to the protection SW via the local bus interface. In this example, the LoC/CLoC message may be identical to the event message 504.

When the destination line card is not matched to the reception line card, the protection processing unit 307 may generate a LoC/CLoC message generation command, and may transfer the LoC/CLoC message generation command to the transmission arbitration unit 309. In other words, the protection switching apparatus 110 may not use the hold-off timer, the hold-off timer expiry queue, and the hold-off queue through the transmission message generation unit 308. Additionally, the transmission arbitration unit 309 may transmit a generated LoC/CLoC message to the packet processor 130 via the interface unit 301, to transmit the generated LoC/CLoC message to a corresponding destination line card. The LoC/CLoC message may be identical to the event message 502.

APS Frame Generation Command Input from the Protection SW of the Host Processor 120 Via the Local Bus Interface The control register unit 311 may extract a value of each of a TX request/state field, a TX Requested signal number (TX Rn) field, and a TX Bridged signal number (TX Bn) field using the $1^{st}$ SW queue, and may transmit the extracted value to the DB controller 310. The DB controller 310 may update a value of each of a TX request, a TX Rn, and a TX Bn in the dynamic TX frame structure table. The control register unit 311 may transmit the APS frame generation command to the transmission arbitration unit 309.

APS Frame Generation Command Input from the Protection SW of the Host Processor 120 Via the Interface Unit 302

The transmission buffer 312 may extract a value of each of a TX request/state field, a TX Rn field, and a TX Bn field using the $2^{nd}$ SW queue, and may transmit the extracted value to the DB controller 310. The DB controller 310 may update a value of each of the TX request, the TX Rn, and the TX Bn in the dynamic TX frame structure table. The transmission buffer 312 may transmit the APS frame generation command to the transmission arbitration unit 309.

FIG. 5 is a diagram illustrating structures of event messages in a protection switching apparatus according to an embodiment.

Referring to FIG. 5, the event message 501 may be used in a data path 4 among message transmission paths, and the event message 502 may be used in a data path 3 for transmission of a LoC/CLoC message received via the interface unit 301, and a data path 11 for transmission of a LoC/CLoC message generation command when a destination line card is not matched to a reception line card. Additionally, the event message 503 may be used in data paths 2, 5, 6, and 8, and the event message 504 may be used in a data path 7. Event messages 505 and 506 may be used in data paths 9 and 10, respectively.

For example, an event message may include a LoC/CLoC flag bit, a destination linecard number bit, a source linecard number bit, a Working and/or Protection (W/P) flag bit, a bypass flag bit, flag bits, a Maintenance Information (MI) switching bit, and a transmit (Xmit) indication flag bit. The LoC/CLoC flag bit may indicate whether the event message is a LoC message or a CLoC message. The destination linecard number bit, and the source linecard number bit may indicate a number of a destination line card, and a number of a source line card, respectively. The W/P flag bit may indicate whether a corresponding path is a working path or a protection path. The bypass flag bit may be used to transmit information directly to the LoC output queue of the transmission message generation unit 308, instead of generating an APS frame generation command and a B/S message generation command, when protection switching is not required. The flag bits may indicate a request/state field, an Rn field, and a Bn field, and may be used to update the dynamic TX frame structure table of the DB controller 310 and to generate an APS frame and a B/S message. The MI switching flag bit may indicate whether protection switching corresponds to a linear 1+1 protection switching architecture or a linear 1:1 protection switching architecture. The Xmit indication flag bit may be used to increment an address of a periodic job memory by "1" at an interval of T3, to generate an APS frame based on an APS frame generation command stored in the periodic job memory, and to transmit the APS frame, when a pulse is generated every cycle with a period of T1 of FIG. 9.

In FIG. 5, each of a connection ID and an APS ID may be represented by 13 bits, however, there is no limitation to a bit length, and accordingly the bit length may be variable. The connection ID may indicate mapping between an MEP ID and a remote MEP ID of line cards connected physically to each other between packet transport systems in a transport network. The APS ID may refer to an ID of an APS process in a line card. The APS process may be mapped by the connection ID, and may be performed to generate and control protection switching commands.

FIG. 6 is a diagram illustrating structures of lookup tables used in a protection switching apparatus according to an embodiment.

A target line card table 610 of FIG. 6 may be a lookup table used in the detection unit 306, and may include an APS ID field, a W/P field, and a destination linecard field associated with a connection ID input through the data path 4.

When a destination line card is matched to a reception line card as a result obtained by looking up the target line card table 610, the detection unit 306 may transmit the event message 504 to the transmission message generation unit 308 through the protection processing unit 307.

When the destination line card is not matched to the reception line card, the detection unit 306 may transmit the event message 502 to the transmission arbitration unit 309 via the local bus interface. To forward a LoC/CLoC message to a corresponding destination line card, the transmission arbitration unit 309 may generate a LoC/CLoC message including an APS ID, and may transmit the LoC/CLoC message to the packet processor 130 via the interface unit 301. The LoC/CLoC message may be identical to the event message 502 of FIG. 5.

An aggregation table 620 of FIG. 6 may be a lookup table used in the transmission arbitration unit 309, and a traffic ID and a number of a destination line card including B/S of protected traffic may be set. When an APS ID is used to aggregate a plurality of connections (for example, PWs) passing through a plurality of User Network Interface (UNI) line cards, the transmission arbitration unit 309 may transmit a generated B/S message to each of destination line cards through the packet processor 130.

FIG. 7 is a diagram illustrating structures of lookup tables used in the DB controller 310.

Referring to FIG. 7, the DB controller 310 may include a MI table 710, a PI table 720, a dynamic TX frame structure table 730. Additionally, the DB controller 310 may include a static TX frame structure table, although not illustrated in FIG. 7.

The MI table 710 may include, for example, a hold-off timer in seconds (sec), a hold-off timer in milliseconds (ms), a temporary SF-W, a temporary SF-P, an affected path, and a hold-off timer running, referred to as an HT running, that are associated with an APS ID input through the data path 7.

The hold-off timer in sec and the hold-off timer in ms may be statically set through a local bus interface, for example a CPU I/F, in operation 711.

In an example in which a LoC message is input, when the holt-off timer has a valid value, the DB controller 310 may update the MI table 710 in operation 712. When the hold-off timer has an invalid value, the DB controller 310 may merely read the MI table 710.

In another example in which a CLoC message is input, when a W/P path of the CLoC message is identical to an affected path, the DB controller 310 may update the MI table 710 in operation 712. When the W/P path is different from the affected path, the DB controller 310 may merely read the MI table 710.

The PI table 720 may include, for example, a local freeze enable, a local SF-W, a local SF-P, and a remote request that are associated with APS IDs input through the data paths 2 and 7. The local freeze enable may be dynamically set through the local bus interface in operation 721. The local SF-W and the local SF-P may be dynamically set based on an event message input through the data path 7 in operation 722, and may be updated. The remote request may be dynamically set based on an event message input through the data path 2 in operation 723, and may be updated.

The dynamic TX frame structure table 730 may include a TX request, a TX Rn, a TX Bn, and a MI switching (MI SW) associated with APS IDs input through the data paths 2, 5, and 7. The TX request, the TX Rn and the TX Bn may be dynamically updated based on an event message input through the data paths 2, 5, and 7 in operation 731. The MI switching (MI SW) may be statically set through the local bus interface in operation 732.

The static TX frame structure table of the DB controller 310 may include header information of a data packet, for example, an Ethernet, an MPLS-TP, and a PW, based on a transport network interface in a packet transport system. The static TX frame structure table may be statically set through the local bus interface.

Additionally, the LoC conversion table of the detection unit 306 may include a W/P flag indicating whether a corresponding path is a working path or a protection path, based on an input APS ID.

Figure 8:
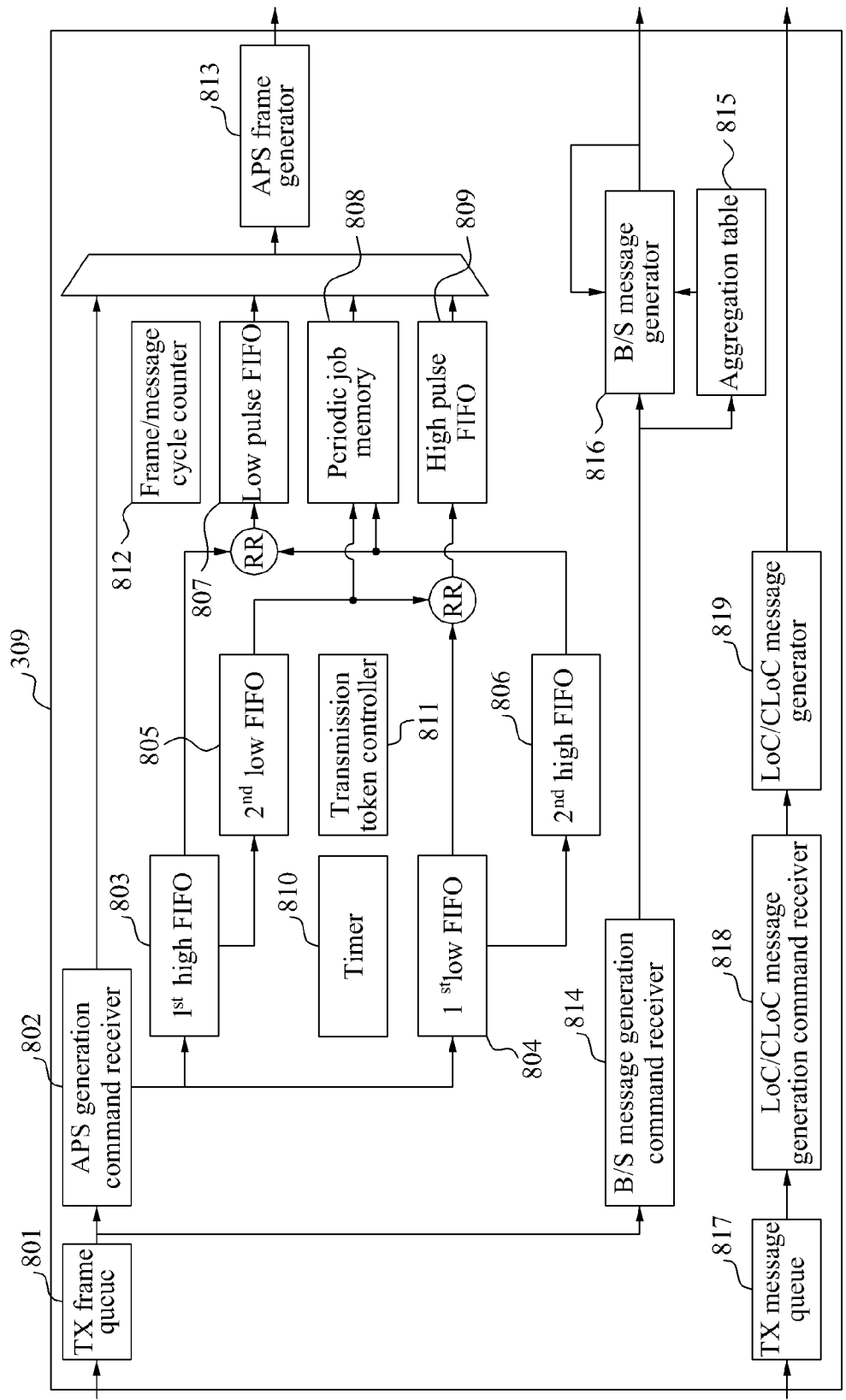
FIG. 8 is a diagram illustrating a configuration of a transmission arbitration unit of FIG. 3.

FIG. 8 is a diagram illustrating a configuration of the transmission arbitration unit 309 of FIG. 3.

Referring to FIG. 8, the transmission arbitration unit 309 may include a TX frame queue 801, an APS frame generation command receiver 802, a $1^{st}$ high First In, First Out (FIFO) 803, a $1^{st}$ low FIFO 804, a $2^{nd}$ low FIFO 805, a $2^{nd}$ high FIFO 806, a low pulse FIFO 807, a periodic job memory 808, a high pulse FIFO 809, a timer 810, a transmission token controller 811, a frame/message cycle counter 812, an APS frame generator 813, a B/S message generation command receiver 814, an aggregation table 815, a B/S message generator 816, a TX message queue 817, a LoC/CLoC message generation command receiver 818, and a LoC/CLoC message generator 819.

For convenience of description, to generate an APS frame, a B/S message, and a LoC/CLoC message, priority may be set in an order of the LoC/CLoC message generation command receiver 818, the B/S message generation command receiver 814, the APS frame generation command receiver 802, the low pulse FIFO 807, the high pulse FIFO 809, and the periodic job memory 808, however, there is no limitation thereto.

The TX frame queue 801 may receive an APS frame generation command and a B/S message generation command through a data path 10, and may classify and store the APS frame generation command and the B/S message generation command.

The APS frame generation command receiver 802 may receive the APS frame generation command input from the TX frame queue 801, and may receive a pulse with a period of "2×T2" provided by the timer 810. When the received pulse is in a high state, the APS frame generation command receiver 802 may store the APS frame generation command in the $1^{st}$ high FIFO 803. When the received pulse is in a low state, the APS frame generation command receiver 802 may store the APS frame generation command in the $1^{st}$ low FIFO 804. The pulse may have a period of T2 in the high state, and a period of T2 in the low state. Additionally, the pulse may refer to a clock pulse, for example, a pulse 2 of FIG. 9.

In an example, when a pulse is in a low state and a transmission path is available based on a token control of the transmission token controller 811, the $1^{st}$ high FIFO 803 may output a stored APS frame generation command. In this example, the $1^{st}$ high FIFO 803 may store the output APS frame generation command in the $2^{nd}$ low FIFO 805. Additionally, the $1^{st}$ high FIFO 803 may store the APS frame generation command and an output of the $2^{nd}$ high FIFO 806 in the low pulse FIFO 807 through a Round-Robin (RR).

In another example, when a pulse is in a high state and a transmission path is available based on the token control of the transmission token controller 811, the $1^{st}$ low FIFO 804 may output a stored APS frame generation command. In this example, the $1^{st}$ low FIFO 804 may store the APS frame generation command in the $2^{nd}$ high FIFO 806. Additionally, the $1^{st}$ low FIFO 804 may store the APS frame generation command and an output of the $2^{nd}$ low FIFO 805 in the high pulse FIFO 809 through the RR.

In still another example, when a pulse is in a high state and a transmission path is available based on the token control of the transmission token controller 811, the $2^{nd}$ low FIFO 805 may output a stored APS frame generation command. In this example, the $2^{nd}$ low FIFO 805 may store the APS frame generation command in the periodic job memory 808. Additionally, the $2^{nd}$ low FIFO 805 may store the APS frame generation command and an output of the $1^{st}$ low FIFO 804 in the high pulse FIFO 809 through the RR.

In yet another example, when a pulse is in a low state and a transmission path is available based on the token control of the transmission token controller 811, the $2^{nd}$ high FIFO 806 may output a stored APS frame generation command. In this example, the $2^{nd}$ high FIFO 806 may store the APS frame generation command in the periodic job memory 808. Additionally, the $2^{nd}$ high FIFO 806 may store the APS frame generation command and an output of the $1^{st}$ high FIFO 803 in the low pulse FIFO 807 through the RR.

The low pulse FIFO 807 may store APS frame generation commands output from the $1^{st}$ high FIFO 803 and the $2^{nd}$ high FIFO 806, through the RR. Additionally, the low pulse FIFO 807 may transfer the APS frame generation command to the APS frame generator 813, through competition with the APS frame generation command receiver 802, the periodic job memory 808 and the high pulse FIFO 809. When the transmission path is available by checking the frame/message cycle counter 812, the low pulse FIFO 807 may transfer the APS frame generation command to the APS frame generator 813 based on the priority.

The periodic job memory 808 may store APS frame generation commands output from the $2^{nd}$ low FIFO 805 and the $2^{nd}$ high FIFO 806. Additionally, the periodic job memory 808 may transfer the APS frame generation command to the APS frame generator 813, through competition with the APS frame generation command receiver 802, the low pulse FIFO 807 and the high pulse FIFO 809.

Figure 9:
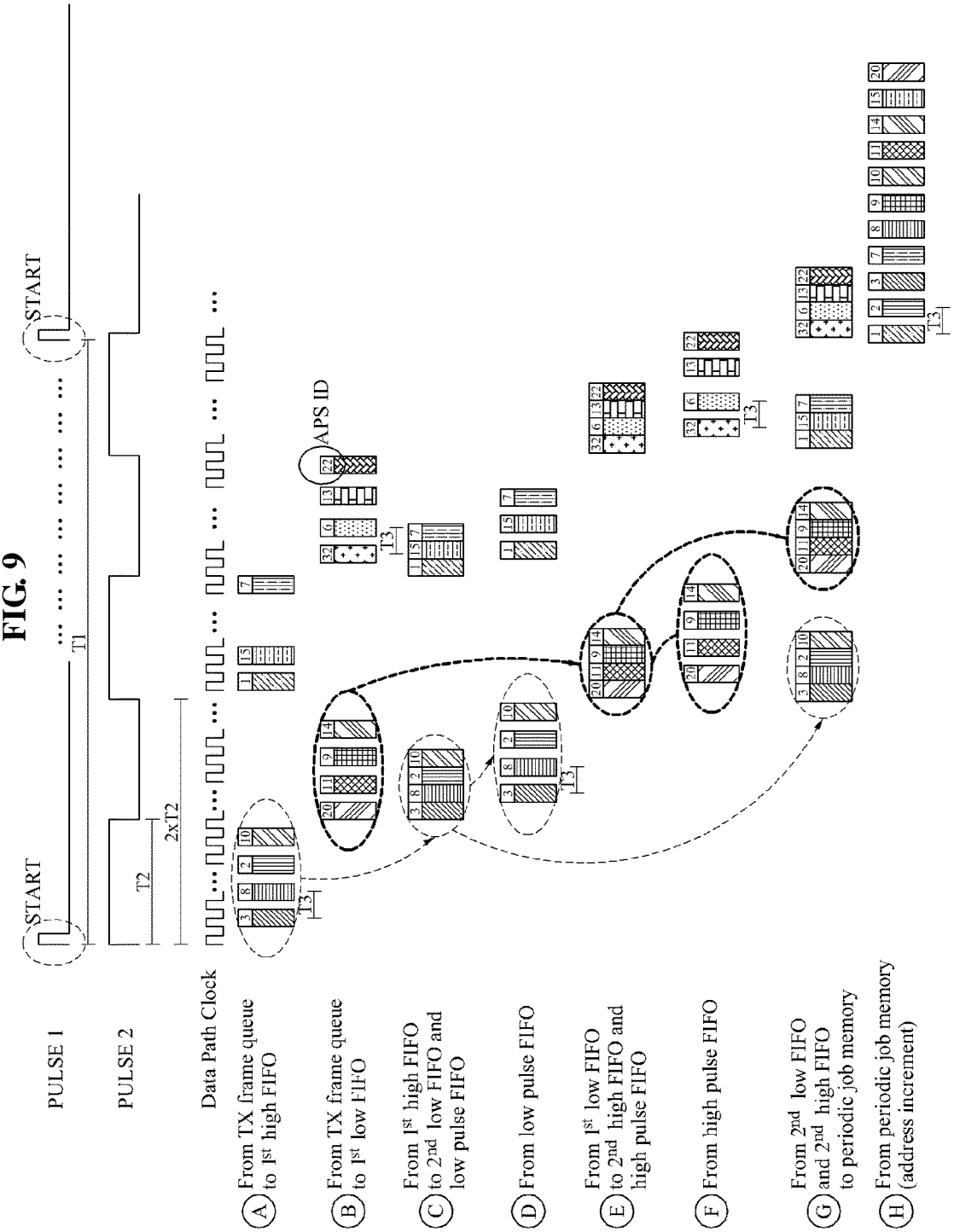
FIG. 9 is a timing diagram illustrating operations of the transmission arbitration unit.

For example, when the frame/message cycle counter 812 is verified, when all of the APS frame generation command receiver 802, the low pulse FIFO 807 and the high pulse FIFO 809 that have higher priority levels are serviced, when a transmission path is available, and when an one-cycle pulse of a data path clock is generated at an interval of T1 as shown in a pulse 1 of FIG. 9, the periodic job memory 808 may transfer all the stored APS frame generation commands to the APS frame generator 813. The periodic job memory 808 may increment an address of each of the stored APS frame generation commands by "1," and may sequentially transfer the APS frame generation commands at an interval of T3.

The high pulse FIFO 809 may store APS frame generation commands output from the $1^{st}$ low FIFO 804 and the $2^{nd}$ low FIFO 805, through the RR. Additionally, the high pulse FIFO 809 may transfer the APS frame generation command to the APS frame generator 813, through competition with the APS frame generation command receiver 802, the low pulse FIFO 807 and the periodic job memory 808. When a transmission path is available by checking the frame/message cycle counter 812, the high pulse FIFO 809 may transfer the APS frame generation command to the APS frame generator 813 based on the priority.

The timer 810 may function to generate and distribute a pulse with a period of T1 or "2×T2" used in the transmission arbitration unit 309 (for example, the pulses 1 and 2 of FIG. 9). The pulse with the period of T1 may refer to a one-cycle pulse of a data path clock generated at an interval of T1. Additionally, the pulse with the period of "2×T2" may indicate that a high pulse with a period of T2 and a low pulse with a period of T2 are repeatedly generated.

The transmission token controller 811 may generate or release a token used to transmit a command and to generate an APS frame, using the frame/message cycle counter 812 and an empty state of each of all FIFOs used in the transmission arbitration unit 309.

The frame/message cycle counter 812 may read, from the static TX frame structure table of the DB controller 310, header information of a data packet, for example an Ethernet, an MPLS-TP, and a PW. Additionally, the frame/message cycle counter 812 may perform cycle counting to provide a pulse with a period of T3 so that an APS frame, a B/S message and a LoC/CLoC message may be generated based on a transport network interface of a packet transport system.

The APS frame generator 813 may read, from the static TX frame structure table, header information of a data packet, for example an Ethernet, an MPLS-TP, and a PW, and may combine APS frames based on the frame/message cycle counter 812 and the transport network interface of the packet transport system.

The B/S message generation command receiver 814 may receive a B/S message generation command from the TX frame queue 801. When generation of a B/S message is enabled by checking a control signal of each of the transmission token controller 811 and the frame/message cycle counter 812, the B/S message generation command receiver 814 may transmit the B/S message generation command to the B/S message generator 816.

The aggregation table 815 may include a traffic ID, and a number of a line card including a B/S of protected traffic.

The B/S message generator 816 may generate a B/S message based on the aggregation table 815 so that a packet processor 130 receiving the B/S message may set a B/S. Additionally, the B/S message generator 816 may combine B/S messages and transmit the combined B/S messages to a packet processor of a corresponding line card.

The TX message queue 817 may recognize a path failure, may receive a LoC/CLoC message via the local bus interface, and may process the LoC/CLoC message. For example, when a destination line card is not matched to a reception line card, by looking up the target line card table 610 of the detection unit 306, the TX message queue 817 may receive a LoC/CLoC message generation command from the protection processing unit 307 and may store the LoC/CLoC message generation command.

When generation of a LoC/CLoC message is determined to be enabled by checking a control signal of the frame/message cycle counter 812, the LoC/CLoC message generation command receiver 818 may transmit a LoC/CLoC message generation command to the LoC/CLoC message generator 819.

The LoC/CLoC message generator 819 may combine LoC/CLoC messages and transmit the combined LoC/CLoC messages to forward the LoC/CLoC messages from the packet processor 130 to a destination line card.

FIG. 9 is a timing diagram illustrating operations of the transmission arbitration unit 309.

FIG. 9 illustrates timing of input and output of the $1^{st}$ high FIFO 803, the $1^{st}$ low FIFO 804, the $2^{nd}$ low FIFO 805, the $2^{nd}$ high FIFO 806, the low pulse FIFO 807, the periodic job memory 808, and the high pulse FIFO 809, when the pulse 1 with the period of T1 or the pulse 2 with the period of "2×T2" is received from the timer 810. However, a timing diagram illustrating transmission from the APS frame generation command receiver 802 to the APS frame generator 813 is not further described. A period of T3 may be changed based on a transmission frame header structure due to a transport network interface, and may be provided from the frame/message cycle counter 812. Additionally, the period of T3 may refer to a single cycle in which an APS frame, a B/S message or a LoC/CLoC message is generated.

Referring to FIG. 9, in operation A, an APS frame generation command may be transferred from the APS frame generation command receiver 802 to the $1^{st}$ high FIFO 803 at an interval of T3, when the pulse 2 is in a high state. The APS frame generation command may be input to the $1^{st}$ high FIFO 803 at the interval of T3, in order to transmit the APS frame generation command from the APS frame generation command receiver 802 to the APS frame generator 813 at the interval of T3, that is, a cycle to generate an APS frame based on a transmission frame header structure. In other words, when an output APS frame generation cycle is not completed, a next APS frame generation command may not be output from the APS frame generation command receiver 802 and accordingly, the APS frame generation command may be input to the $1^{st}$ high FIFO 803 at the interval of T3.

In operation B, an APS frame generation command may be transferred from the APS frame generation command receiver 802 to the $1^{st}$ low FIFO 804 at the interval of T3, when the pulse 2 is in a low state. The APS frame generation command may be input to the $1^{st}$ low FIFO 804 at the interval of T3, in order to transmit the APS frame generation command from the APS frame generation command receiver 802 to the APS frame generator 813 at the interval of T3.

In operation C, an output of the $1^{st}$ high FIFO 803 may be input to the $2^{nd}$ low FIFO 805 and the low pulse FIFO 807. The $1^{st}$ high FIFO 803 may directly output an APS frame generation command only when the APS frame generation command is stored in the $1^{st}$ high FIFO 803, instead of outputting the APS frame generation command at the interval of T3.

In operation D, an APS frame generation command may be output from the low pulse FIFO 807 at the interval of T3, when the pulse 2 is in the low state. The APS frame generation command may be output at the interval of T3, in order to transmit the APS frame generation command from the low pulse FIFO 807 to the APS frame generator 813 at the interval of T3, that is, a cycle to generate an APS frame based on a transmission frame header structure. In other words, when an output APS frame generation cycle is not completed, a next APS frame generation command may not be output from the low pulse FIFO 807 and accordingly, the APS frame generation command may be output at the interval of T3.

In operation E, an output of the $1^{st}$ low FIFO 804 may be input to the $2^{nd}$ high FIFO 806 and the high pulse FIFO 809. The $1^{st}$ low FIFO 804 may directly output an APS frame generation command only when the APS frame generation command is stored in the $1^{st}$ low FIFO 804, instead of outputting the APS frame generation command at the interval of T3

In operation F, an APS frame generation command may be output from the high pulse FIFO 809 at the interval of T3, when the pulse 2 is in the high state. The APS frame generation command may be output at the interval of T3, in order to transmit the APS frame generation command from the high pulse FIFO 809 to the APS frame generator 813 at the interval of T3, that is, a cycle to generate an APS frame based on a transmission frame header structure. In other words, when an output APS frame generation cycle is not completed, a next APS frame generation command may not be output from the high pulse FIFO 809 and accordingly, the APS frame generation command may be output at the interval of T3.

In operation G, APS frame generation commands may be transferred from the $2^{nd}$ low FIFO 805 and the $2^{nd}$ high FIFO 806 to the periodic job memory 808, based on a state of the pulse 2, for example a high state or a low state. Each of the $2^{nd}$ low FIFO 805 and the $2^{nd}$ high FIFO 806 may directly output an APS frame generation command only when the APS frame generation command is stored, instead of outputting the APS frame generation command at the interval of T3.

In operation H, among APS frame generation commands input from the $2^{nd}$ low FIFO 805 and the $2^{nd}$ high FIFO 806 and stored in the periodic job memory 808 in which an APS ID is used as an address, an APS frame generation command in which an Xmit flag is set may be output to the APS frame generator 813 at the interval of T3 based on the transmission frame header structure, by incrementing the address of the periodic job memory 808 by "1" every time a one-cycle pulse of a data path clock with a period of T1, that is, a start signal is generated.

FIGS. 10 through 14 illustrate a protection switching method performed by the protection switching apparatus 110 of FIG. 1.

The protection switching method may be performed when a LoC/CLoC message or an APS frame is received from the host processor 120 and the packet processor 130 of FIG. 1.

The protection switching apparatus 110 may include four input queues, for example, a LoC queue 1010, an APS queue 1020, a $1^{st}$ SW queue 1110, and a $2^{nd}$ SW queue 1210. For convenience of description, an input queue priority for processing the input queues may be set in an order of the LoC queue 1010, the APS queue 1020, the $1^{st}$ SW queue 1110, and the $2^{nd}$ SW queue 1210, however, there is no limitation thereto.

Figure 10:
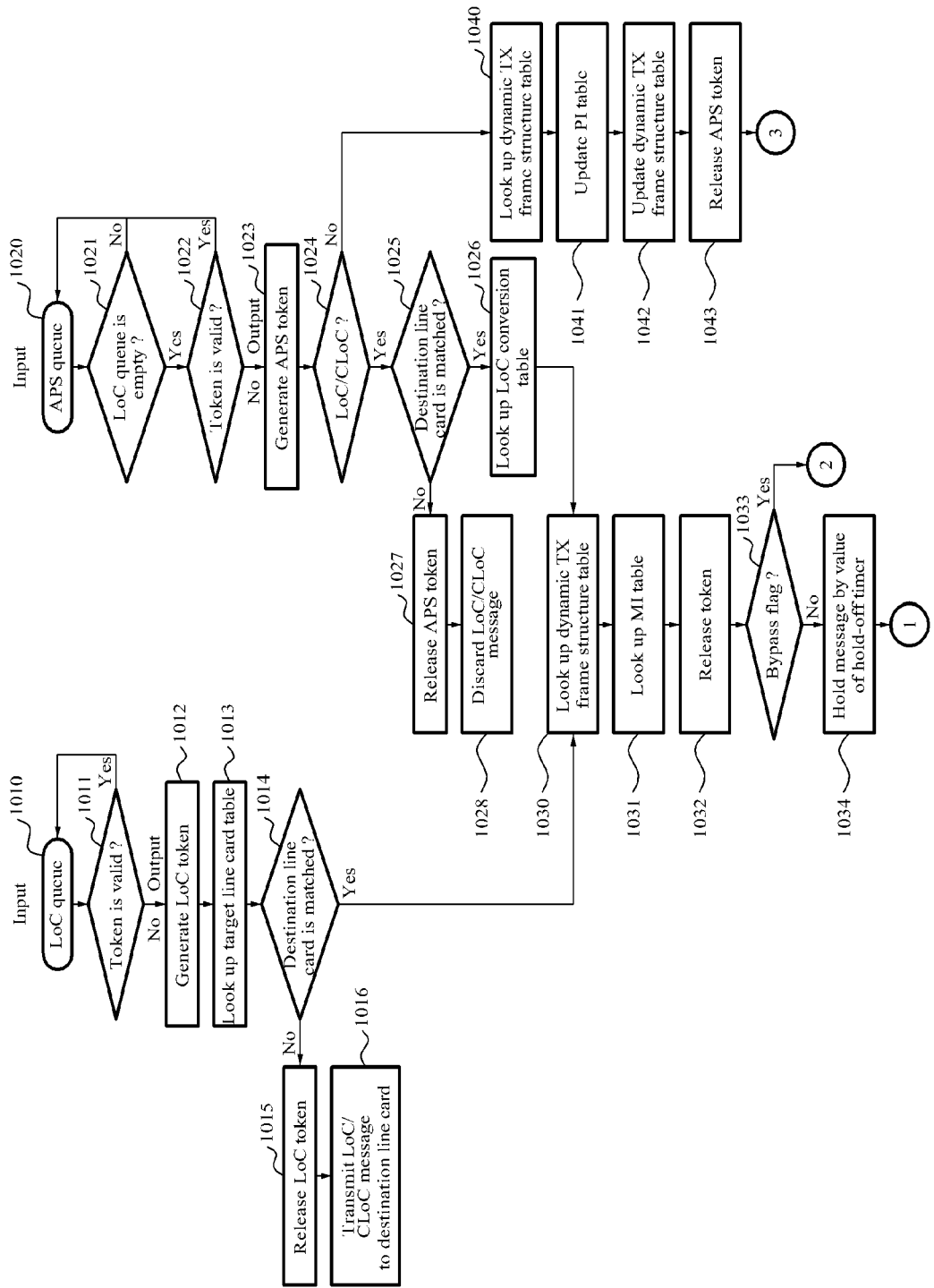
FIGS. 10 through 14 illustrate a protection switching method performed by the protection switching apparatus.

Referring to FIG. 10, the classification unit 304 may receive a LoC/CLoC message from the host processor 120 and may store the LoC/CLoC message in the LoC queue 1010.

In operation 1011, the classification unit 304 may determine whether a valid token exists. When the valid token exists, the classification unit 304 may enable the LoC/CLoC message to remain in the LoC queue 1010 until the valid token is released, instead of the LoC/CLoC message being serviced. The valid token may refer to a token that is currently being serviced.

When the valid token does not exist, the classification unit 304 may enable the LoC/CLoC message to be output from the LoC queue 1010, and may generate a LoC token in operation 1012.

When the LoC token is generated, the detection unit 306 may look up the target line card table in operation 1013.

In operation 1014, the detection unit 306 may determine whether a destination line card of the LoC/CLoC message is matched to a reception line card.

When the destination line card is matched to the reception line card, the DB controller 310 may look up the dynamic TX frame structure table in operation 1030.

When the destination line card is not matched to the reception line card, the protection processing unit 307 may release the LoC token in operation 1015. In operation 1016, the protection processing unit 307 may generate a LoC/CLoC message generation command, and may transmit the LoC/CLoC message generation command to the LoC/CLoC message generation command receiver 818 of the transmission arbitration unit 309, to transmit a LoC/CLoC message to the destination line card.

The classification unit 304 may receive, from the packet processor 130, an APS frame or a LoC/CLoC message, and may store the APS frame or the LoC/CLoC message in the APS queue 1020.

In operation 1021, the classification unit 304 may determine whether the LoC queue 1010 is empty, based on the input queue priority. In other words, the classification unit 304 may check a state of the LoC queue 1010. When an event message that is not yet serviced exists in the LoC queue 1010, the classification unit 304 may enable the APS frame or the LoC/CLoC message to remain in the APS queue 1020.

When the LoC queue 1010 is empty, that is, when all messages in the LoC queue 1010 are serviced, the classification unit 304 may determine whether a valid token exists in operation 1022. When the valid token exists, the classification unit 304 may enable the APS frame or the LoC/CLoC message to remain in the APS queue 1020 until the valid token is released, instead of the APS frame or the LoC/CLoC message being serviced.

When the valid token does not exist, the classification unit 304 may enable the APS frame or the LoC/CLoC message to be output from the APS queue 1020, and may generate an APS token in operation 1023.

When the APS token is generated, the classification unit 304 may determine whether the APS token corresponds to the LoC/CLoC message in operation 1024.

When the APS token corresponds to the LoC/CLoC message, the detection unit 306 may determine whether a destination line card of the LoC/CLoC message is matched to a reception line card in operation 1025.

When the destination line card is not matched to the reception line card, the detection unit 306 may release the APS token in operation 1027, and may discard the LoC/CLoC message in operation 1028.

When the destination line card is matched to the reception line card, the detection unit 306 may look up the LoC conversion table in operation 1026.

In operation 1030, the DB controller 310 may look up the dynamic TX frame structure table.

When the APS token does not correspond to the LoC/CLoC message, the DB controller 310 may look up the dynamic TX frame structure table in operation 1040.

In operation 1041, the DB controller 310 may update a remote request field of the PI table.

In operation 1042, the DB controller 310 may update the dynamic TX frame structure table.

In operation 1043, the DB controller 310 may release the APS token, and may transmit the APS frame to initiate process ③.

After operation 1030, the DB controller 310 may look up the MI table in operation 1031, and may release a valid token in operation 1032.

In operation 1033, the DB controller 310 may determine whether a bypass flag is set. When the bypass flag is set, the DB controller 310 may transmit the LoC/CLoC message to initiate process ②.

When the bypass flag is not set, the transmission message generation unit 308 may hold the LoC/CLoC message by a value of a hold-off timer set for each APS ID, and may transmit the LoC/CLoC message in operation 1034 to initiate process ①.

Figure 11:
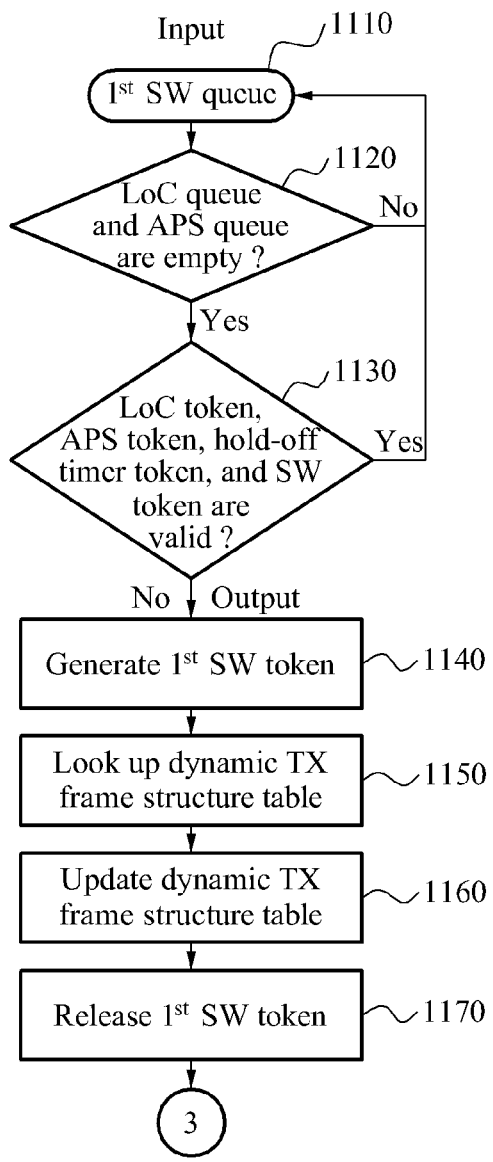

Referring to FIG. 11, the control register unit 311 may receive an APS frame generation command from the host processor 120 via the local bus interface, and may store the APS frame generation command in the $1^{st}$ SW queue 1110.

In operation 1120, the control register unit 311 may determine whether the LoC queue 1010 and the APS queue 1020 are empty, based on the input queue priority. In other words, the control register unit 311 may check a state of each of the LoC queue 1010 and the APS queue 1020. When an event message that is not yet serviced exists in the LoC queue 1010 and the APS queue 1020, the control register unit 311 may enable the APS frame generation command to remain in the $1^{st}$ SW queue 1110.

When both the LoC queue 1010 and the APS queue 1020 are empty, that is, when all messages in each of the LoC queue 1010 and the APS queue 1020 are serviced, the control register unit 311 may determine whether a message being serviced by issuing a LoC token, an APS token, a hold-off timer token, and an SW token (for example, a $1^{st}$ SW token and a $2^{nd}$ SW token) exists in operation 1130. In other words, the control register unit 311 may determine whether each of the LoC token, the APS token, the hold-off timer token and the SW token is valid. When a valid token exists among the LoC token, the APS token, the hold-off timer token and the SW token, the control register unit 311 may enable the APS frame generation command to remain in the $1^{st}$ SW queue 1110 until the valid token is released, instead of the APS frame generation command being serviced.

When the valid token does not exist, the control register unit 311 may enable the APS frame generation command to be output from the $1^{st}$ SW queue 1110, and may generate a $1^{st}$ SW token in operation 1140.

In operation 1150, the DB controller 310 may look up the dynamic TX frame structure table.

When the APS frame generation command is not discarded, the DB controller 310 may update the dynamic TX frame structure table with a value of each of a TX request/state field, a TX Rn field, and a TX Bn field in the APS frame generation command in operation 1160. In operation 1170, the DB controller 310 may release the $1^{st}$ SW token, and may transmit the APS frame generation command to initiate process ③.

Figure 12:
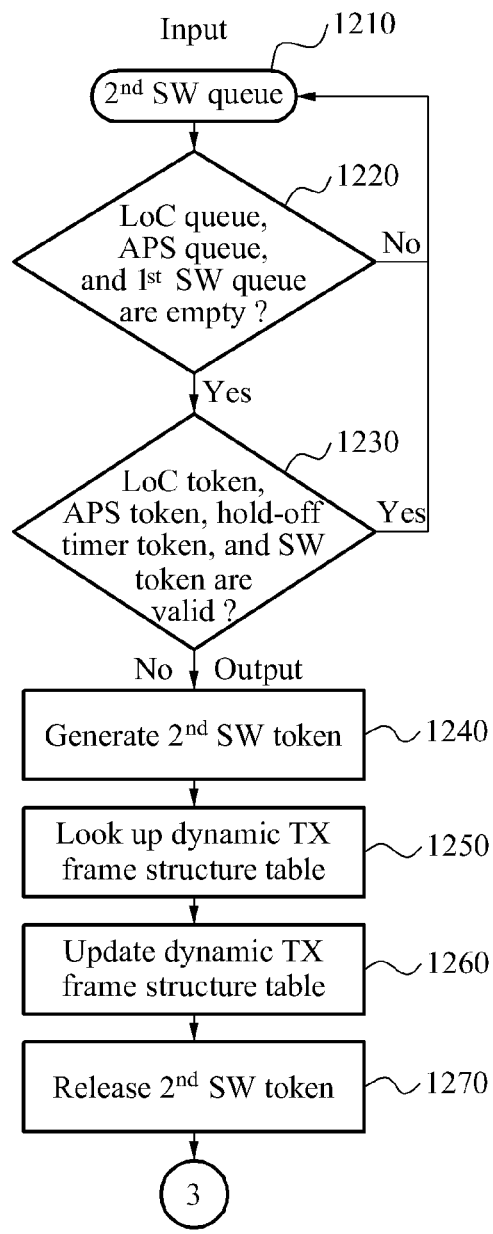

Referring to FIG. 12, the transmission buffer 312 may receive an APS frame generation command via the interface unit 302 from the host processor 120, and may store the APS frame generation command in the $2^{nd}$ SW queue 1210.

In operation 1220, the transmission buffer 312 may determine whether the LoC queue 1010, the APS queue 1020 and the $1^{st}$ SW queue 1110 are empty based on the input queue priority. In other words, the transmission buffer 312 may check a state of each of the LoC queue 1010, the APS queue 1020 and the $1^{st}$ SW queue 1110. When an event message that is not yet serviced exists in the LoC queue 1010, the APS queue 1020, or the $1^{st}$ SW queue 1110, the transmission buffer 312 may enable the APS frame generation command to remain in the $2^{nd}$ SW queue 1210.

When all of the LoC queue 1010, the APS queue 1020 and the 1$^{st}$ SW queue 1110 are empty, that is, when all messages in each of the LoC queue 1010, the APS queue 1020 and the 1$^{st}$ SW queue 1110 are serviced, the transmission buffer 312 may determine whether an event message being serviced by issuing each of a LoC token, an APS token, an hold-off timer token, and an SW token (for example, a 1$^{st}$ SW token and a 2$^{nd}$ SW token) exists in operation 1230. When a valid token exists among the LoC token, the APS token, the hold-off timer token and the SW token, the transmission buffer 312 may enable the APS frame generation command to remain in the 2$^{nd}$ SW queue 1210 until the valid token is released, instead of the APS frame generation command being serviced.

When the valid token does not exist, the transmission buffer 312 may enable the APS frame generation command to be output from the 2$^{nd}$ SW queue 1210, and may generate a 2$^{nd}$ SW token in operation 1240.

In operation 1250, the DB controller 310 may look up the dynamic TX frame structure table.

When the APS frame generation command is not discarded, the DB controller 310 may update the dynamic TX frame structure table with a value of each of a TX request/state field, a TX Rn field, and a TX Bn field in the APS frame generation command in operation 1260. In operation 1270, the DB controller 310 may release the 1$^{st}$ SW token, and may transmit the APS frame generation command to initiate process ③.

Figure 13:
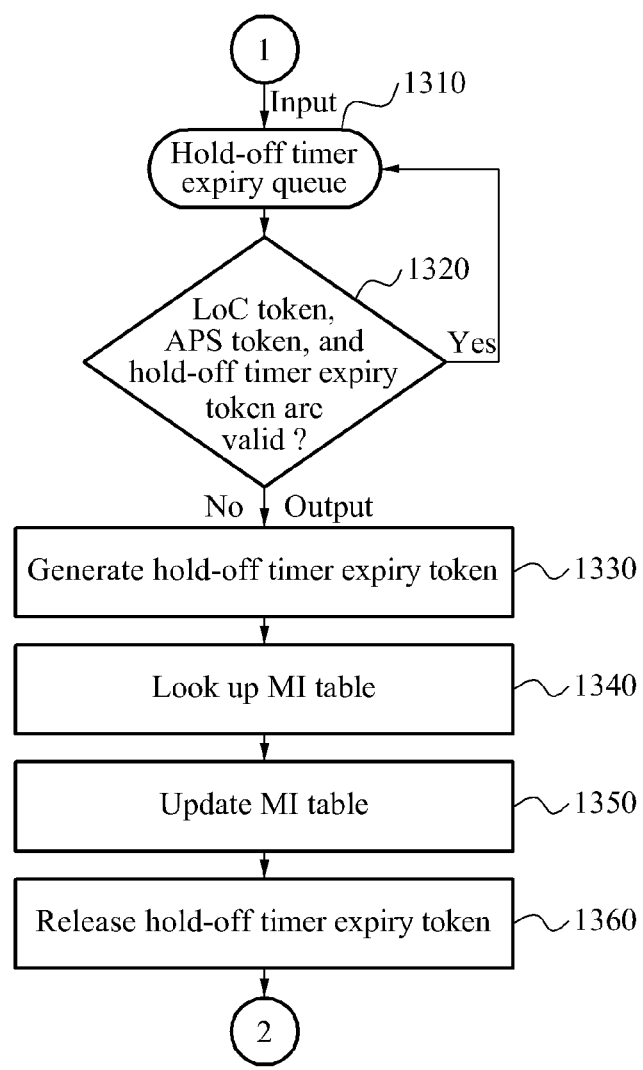

Referring to FIG. 13, the transmission message generation unit 308 may store a message in which the value of the hold-off timer expires in a hold-off timer expiry queue 1310.

In operation 1320, the transmission message generation unit 308 may determine whether an event message being serviced by issuing a LoC token, an APS token, and a hold-off timer expiry token exists. In other words, the transmission message generation unit 308 may determine whether a valid token exists among the LoC token, the APS token, and the hold-off timer expiry token. When the valid token exists, the transmission message generation unit 308 may enable the message to remain in the hold-off timer expiry queue 1310 until the valid token is released, instead of the message being serviced.

When the valid token does not exist, the transmission message generation unit 308 may enable the message to be output from the hold-off timer expiry queue 1310, and may generate a hold-off timer expiry token in operation 1330.

In operation 1340, the DB controller 310 may look up the MI table. In operation 1350, the DB controller 310 may update the MI table.

In operation 1360, the DB controller 310 may release the hold-off timer expiry token, and may transmit the message to initiate process ②.

Figure 14:
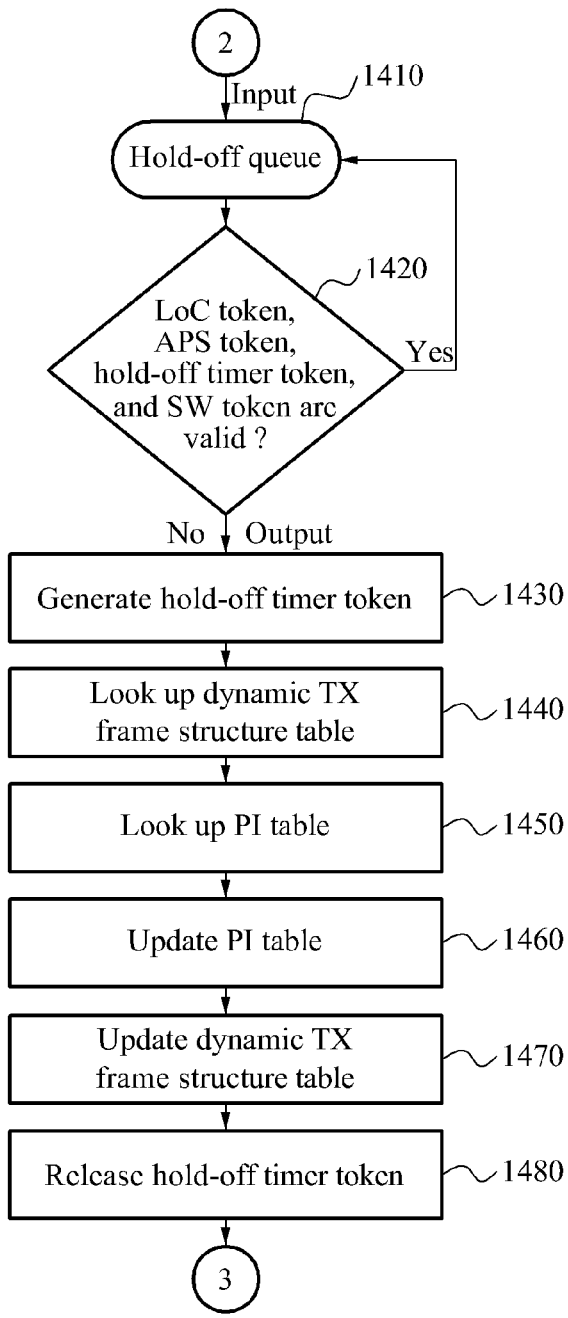

Referring to FIG. 14, the transmission message generation unit 308 may store the received message in a hold-off queue 1410.

In operation 1420, the transmission message generation unit 308 may determine whether a message being serviced by issuing a LoC token, an APS token, an hold-off timer token, and an SW token (for example, a 1$^{st}$ SW token and a 2$^{nd}$ SW token) exists. In other words, the transmission message generation unit 308 may determine whether each of the LoC token, the APS token, the hold-off timer token and the SW token is valid. When a valid token exists among the LoC token, the APS token, the hold-off timer token and the SW token, the transmission message generation unit 308 may enable the message to remain in the hold-off queue 1410 until the valid token is released, instead of the message being serviced.

When the valid token does not exist, the transmission message generation unit 308 may enable the message to be output from the hold-off queue 1410, and may generate a hold-off timer token in operation 1430.

The DB controller 310 may look up the dynamic TX frame structure table in operation 1440, and may look up the PI table in operation 1450.

In operation 1460, the DB controller 310 may update fields of the PI table.

When an APS frame generation command is not discarded, the DB controller 310 may update the dynamic TX frame structure table with a value of each of a TX request/state field, a TX Rn field, and a TX Bn field in an input command in operation 1470.

In operation 1480, the DB controller 310 may release the hold-off timer token, and may transmit the message to initiate process ③.

FIGS. 15 through 19 illustrate a transmission arbitration operation of the protection switching method. The transmission arbitration operation may be performed by the transmission arbitration unit 309 of the protection switching apparatus 110.

A packet processing scheme, except for a memory flow by a memory control, is omitted to clearly describe embodiments of the present invention.

Figure 15:
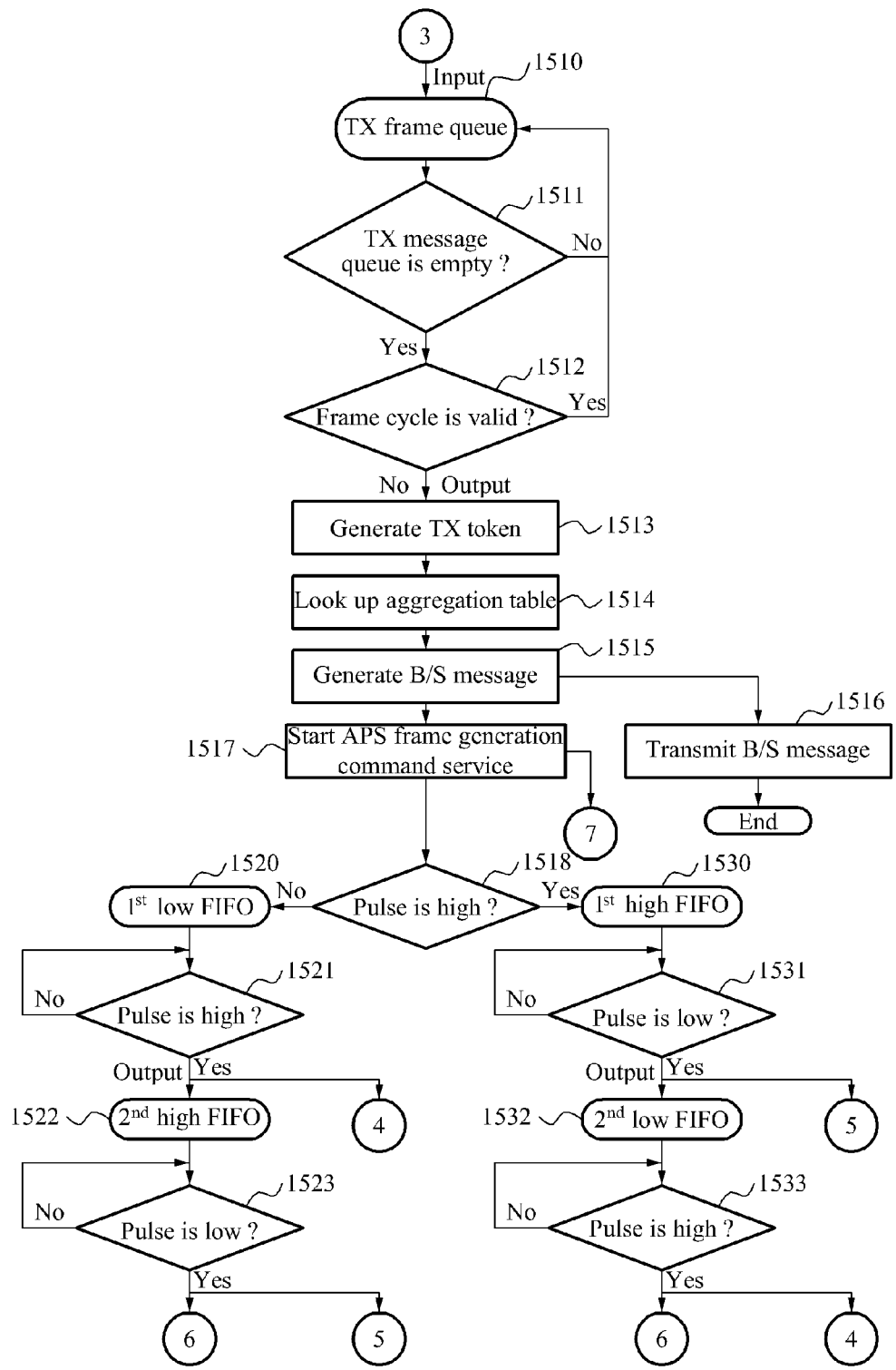
FIGS. 15 through 19 illustrate a transmission arbitration operation of the protection switching method.

Referring to FIG. 15, the transmission arbitration unit 309 may store a command to generate received data in a TX frame queue 1510.

In operation 1511, the transmission arbitration unit 309 may determine whether the TX message queue 817 is empty, that is, whether all messages in the TX message queue 817 are serviced. When the TX message queue 817 is not empty because all of the messages are not serviced, the transmission arbitration unit 309 may enable the received data to remain in the TX frame queue 1510.

When the TX message queue 817 is empty, the transmission arbitration unit 309 may determine whether a frame cycle for generation of an APS frame or a B/S message is valid in operation 1512. When the frame cycle is valid, the transmission arbitration unit 309 may enable the received data to remain in the TX frame queue 1510.

When the frame cycle is not valid, the transmission arbitration unit 309 may generate a TX token based on the command output from the TX frame queue 1510 in operation 1513.

In operation 1514, the transmission arbitration unit 309 may look up an aggregation table to generate a B/S message.

In operation 1515, the transmission arbitration unit 309 may generate a B/S message based on a lookup result.

In operation 1516, the transmission arbitration unit 309 may transmit the B/S message via the interface unit 301 to the packet processor 130. While transmitting the B/S message, the transmission arbitration unit 309 may start an APS frame generation command service in operation 1517, and may transmit the APS frame generation command to initiate process ⑦.

In operation 1518, the transmission arbitration unit 309 may determine whether a pulse with a period of T2 is in a high state or a low state.

When the pulse is low, the transmission arbitration unit 309 may store the APS frame generation command in a 1$^{st}$ low FIFO 1520. When the pulse is high, the transmission arbitration unit 309 may store the APS frame generation command in a 1$^{st}$ high FIFO 1530.

In operation 1521, the transmission arbitration unit 309 may determine whether the pulse with the period of T2 is in the high state. When the pulse is in the high state, the transmission arbitration unit 309 may transmit the APS frame generation command to initiate process ④, while storing the APS frame generation command in a $2^{nd}$ high FIFO 1522.

In operation 1523, the transmission arbitration unit 309 may determine whether the pulse with the period of T2 is in the low state. When the pulse is in the low state, the transmission arbitration unit 309 may simultaneously transmit APS frame generation commands to initiate processes ⑤ and ⑥.

In operation 1531, the transmission arbitration unit 309 may determine whether the pulse with the period of T2 is in the low state. When the pulse is in the low state, the transmission arbitration unit 309 may transmit the APS frame generation command to initiate process ⑤, while storing the APS frame generation command in a $2^{nd}$ low FIFO 1532.

In operation 1533, the transmission arbitration unit 309 may determine whether the pulse with the period of T2 is in the high state. When the pulse is in the high state, the transmission arbitration unit 309 may simultaneously transmit the APS frame generation commands to initiate processes ④ and ⑥.

Figure 16:
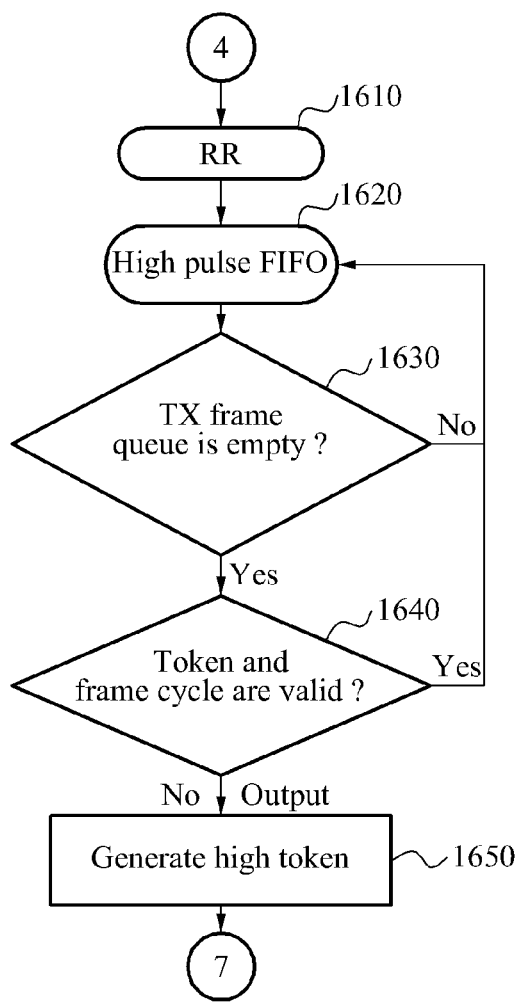

Referring to FIG. 16, the transmission arbitration unit 309 may store the received APS frame generation commands in a high pulse FIFO 1620 using an RR scheme 1610.

In operation 1630, the transmission arbitration unit 309 may determine whether the TX frame queue 1510 is empty, that is, whether all messages in the TX frame queue 1510 are serviced.

When the TX frame queue 1510 is empty, the transmission arbitration unit 309 may determine whether a valid token and a valid frame cycle exist in operation 1640.

When the TX frame queue 1510 is not empty, or when the valid token and the valid frame cycle exist, the transmission arbitration unit 309 may enable the APS frame generation commands to remain in the high pulse FIFO 1620, instead of the APS frame generation commands being serviced.

When the TX frame queue 1510 is empty and when the valid token and the valid frame cycle do not exist, the transmission arbitration unit 309 may enable the APS frame generation commands to be output from the high pulse FIFO 1620, may generate a high token in operation 1650, and may transmit the APS frame generation commands to initiate process ⑦.

Figure 17:
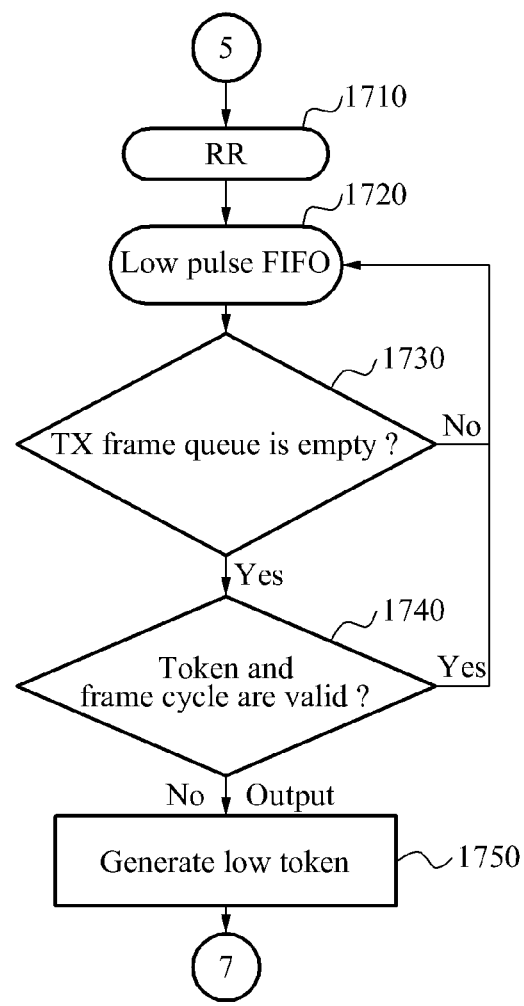

Referring to FIG. 17, the transmission arbitration unit 309 may store the received APS frame generation commands in a low pulse FIFO 1720 using an RR scheme 1710.

In operation 1730, the transmission arbitration unit 309 may determine whether the TX frame queue 1510 is empty.

When the TX frame queue 1510 is empty, the transmission arbitration unit 309 may determine whether a valid token and a valid frame cycle exist in operation 1740.

When the TX frame queue 1510 is not empty, or when the valid token and the valid frame cycle exist, the transmission arbitration unit 309 may enable the APS frame generation commands to remain in the low pulse FIFO 1720, instead of the APS frame generation commands being serviced.

When the TX frame queue 1510 is empty and when the valid token and the valid frame cycle do not exist, the transmission arbitration unit 309 may enable the APS frame generation commands to be output from the low pulse FIFO 1720, may generate a low token in operation 1750, and may transmit the APS frame generation commands to initiate process ⑦.

Figure 18:
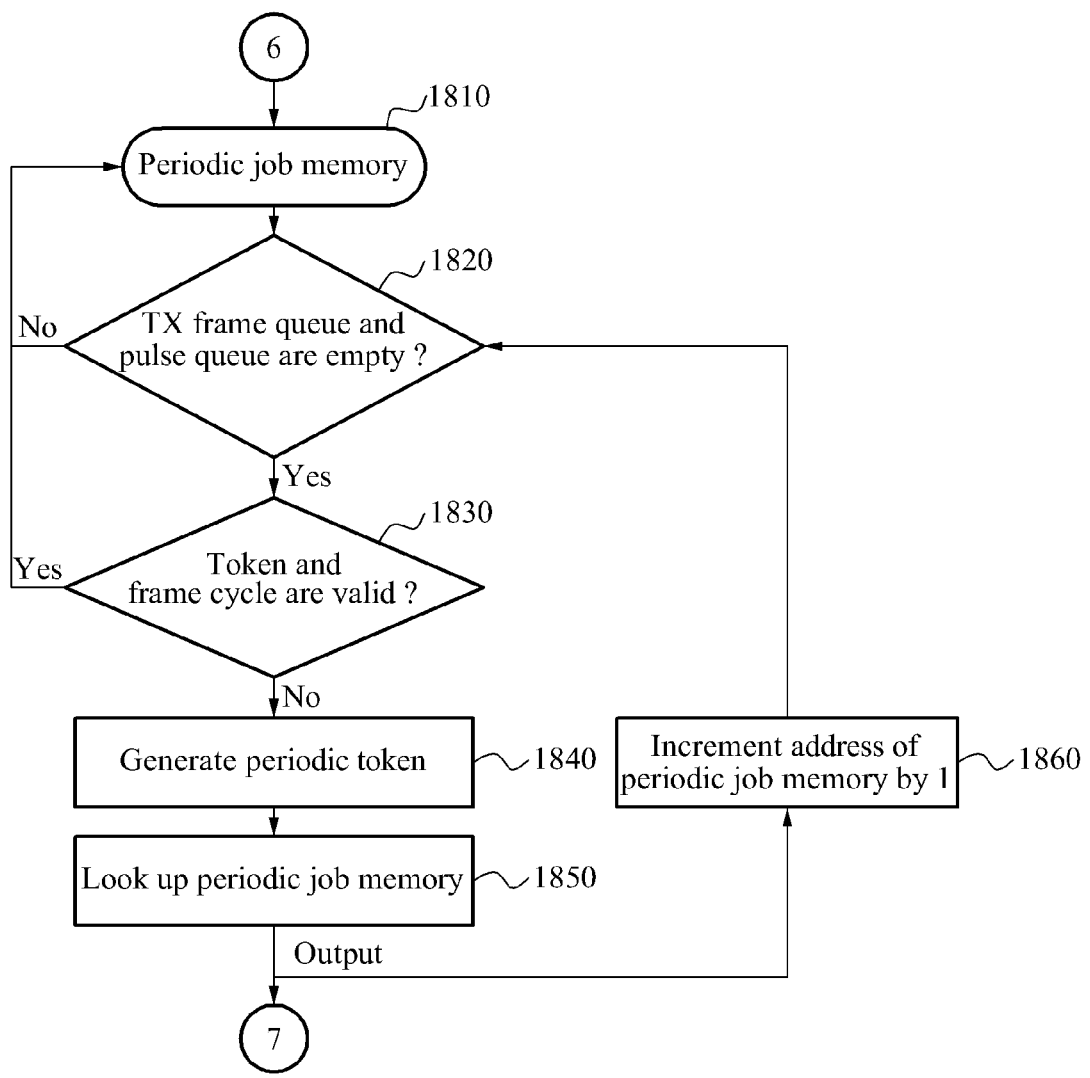

Referring to FIG. 18, the transmission arbitration unit 309 may store the received APS frame generation commands in a periodic job memory 1810.

In operation 1820, the transmission arbitration unit 309 may determine whether the TX frame queue 1510 and a pulse queue are empty, that is, whether all messages in the TX frame queue 1510 and the pulse queue are serviced. The pulse queue may include the high pulse FIFO 1620 and the low pulse FIFO 1720.

When the TX frame queue 1510 and the pulse queue are empty, the transmission arbitration unit 309 may determine whether a valid token and a valid frame cycle exist in operation 1830.

When the TX frame queue 1510 and the pulse queue are not empty, or when the valid token and the valid frame cycle exist, the transmission arbitration unit 309 may enable the APS frame generation commands to remain in the periodic job memory 1810, instead of the APS frame generation commands being serviced.

When the TX frame queue 1510 and the pulse queue are empty and when the valid token and the valid frame cycle do not exist, the transmission arbitration unit 309 may generate a periodic token in operation 1840.

The transmission arbitration unit 309 may look up the periodic job memory 1810 in operation 1850, and may output an APS frame generation command to be serviced. The transmission arbitration unit 309 may increment an address of the periodic job memory 1810 by "1" in operation 1860, and operation 1820 may be re-performed, while transmitting the APS frame generation command to initiate process ⑦.

Figure 19:
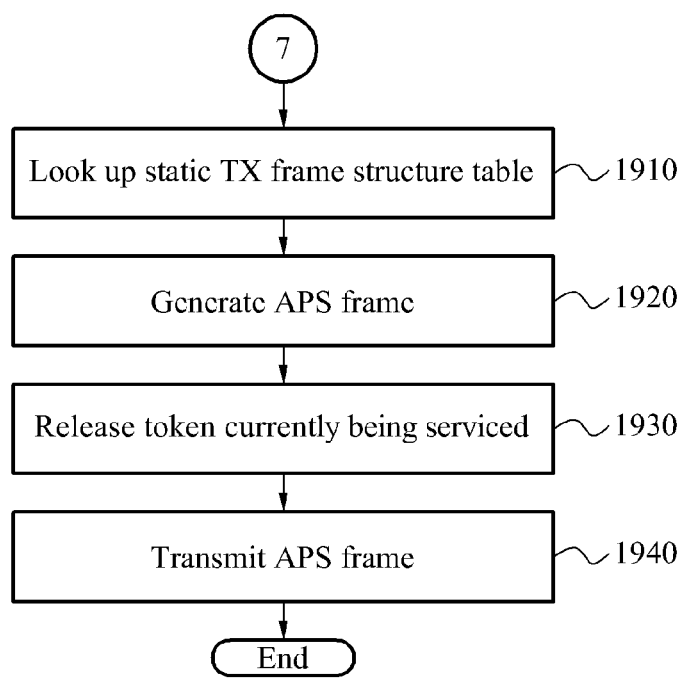

Referring to FIG. 19, in operation 1910, the transmission arbitration unit 309 may look up the static TX frame structure table of the DB controller 310, to service the received APS frame generation commands.

Based on a lookup result, the transmission arbitration unit 309 may generate an APS frame in operation 1920, may release a token that is currently being serviced in operation 1930, and may transmit the APS frame via the interface unit 301 in operation 1940.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to exemplary embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method for performing protection switching of a data path between packet transport systems, each comprising a line card, based on control data transmitted and received between a packet processor and a host processor in a line card, the method comprising:
    determining whether traffic switching for protection switching is required, when control data input from the packet processor is a first Automatic Protection Switching (APS) frame;
    generating an APS frame generation command and a Bridge and Selector (B/S) message generation command corresponding to the first APS frame, when the traffic switching is required; and
    transmitting, to the packet processor, a second APS frame generated based on the APS frame generation command, and a B/S message generated based on the B/S message generation command,
    wherein the packet processor performs protection switching through traffic switching based on the B/S message, and
    wherein the generating comprises generating a command to generate a B/S message that is to be transmitted to a packet processor of a destination line card included in a packet transport system corresponding to an APS identification (ID) included in the B/S message generation command.

2. The method of claim 1, wherein the determining comprises, when a request/state field of the first APS frame indicates a Signal Fail on Working transport entity (SF-W) or a Signal Fail on Protection transport entity (SF-P), determining whether the traffic switching is required.

3. The method of claim 1, wherein the determining comprises determining whether the traffic switching is required, based on at least one of a Forced Switch (FS) mode, a Lock-Out (LO) mode, and a freeze mode.

4. A method for performing protection switching of a data path between packet transport systems, each comprising a line card, based on control data transmitted and received between a packet processor and a host processor in a line card, the method comprising:
    determining whether a destination line card corresponding to a Loss of Continuity (LoC)/Clear Loss of Continuity (CLoC) message received from another line card of a packet transport system is matched to a reception line card, when control data input from the packet processor is the LoC/CLoC message;
    determining whether a value of a hold-off timer corresponding to an APS identification (ID) included in the LoC/CLoC message is set, when the destination line card is matched to the reception line card;
    delaying the LoC/CLoC message by the value of the hold-off timer, when the value of the hold-off timer is set;
    determining whether traffic switching for protection switching is required, based on the LoC/CLoC message;
    generating an Automatic Protection Switching (APS) frame generation command and a Bridge and Selector (B/S) message generation command corresponding to the LoC/CLoC message, when the traffic switching is required; and
    transmitting, to the packet processor, an APS frame generated based on the APS frame generation command, and a B/S message generated based on the B/S message generation command,
    wherein the packet processor performs protection switching through traffic switching based on the B/S message, and is included in the reception line card.

5. The method of claim 4, wherein the determining whether the traffic switching is required comprises determining whether the traffic switching is required, based on whether a path failure occurs in an active transport entity corresponding to a protection switching apparatus.

6. The method of claim 4, further comprising: transmitting the LoC/CLoC message to the host processor, when the traffic switching is not required.

7. The method of claim 4, further comprising: discarding the LoC/CLoC message, when the destination line card is not matched to the reception line card.

8. A method for performing protection switching of a data path between packet transport systems, each comprising a line card, based on control data transmitted and received between a packet processor and a host processor in a line card, the method comprising:
    determining whether a destination line card corresponding to a first Loss of Continuity (LoC)/Clear Loss of Continuity (CLoC) message is matched to a reception line card, when control data input from the host processor is the first LoC/CLoC message;

determining whether traffic switching for protection switching is required, based on the first LoC/CLoC message, when the destination line card is matched to the reception line card;

generating an Automatic Protection Switching (APS) frame generation command and a Bridge and Selector (B/S) message generation command corresponding to the first LoC/CLoC message;

transmitting, to the packet processor, an APS frame generated based on the APS frame generation command, and a B/S message generated based on the B/S message generation command, when the traffic switching is required, generating a second LoC/CLoC message to correspond to the destination line card, and transmitting the second LoC/CLoC message to a packet processor of a destination line card corresponding to an APS identification (ID), when the destination line card is not matched to the reception line card;

wherein the packet processor performs protection switching through traffic switching based on the B/S message, and is included in the reception line card, and wherein the APS ID is included in the second LoC/CLoC message.

9. The method of claim 8, wherein the transmitting comprises transmitting the B/S message to a packet processor of a destination line card corresponding to an APS ID included in the first LoC/CLoC message.

\* \* \* \* \*